US011972398B2

(12) United States Patent
Esmalifalak et al.

(10) Patent No.: US 11,972,398 B2
(45) Date of Patent: Apr. 30, 2024

(54) MACHINE LEARNING POWERED ANOMALY DETECTION FOR MAINTENANCE WORK ORDERS

(71) Applicants: Mohammad Esmalifalak, Toronto (CA); Akshay Iyengar, Toronto (CA); Seyedmorteza Mirhoseininejad, Toronto (CA); Peter Doulas, Toronto (CA); Francis Emery, Toronto (CA); Taylor Mathewson, Toronto (CA); William Hogan, Toronto (CA); Min Hua Yu, Toronto (CA)

(72) Inventors: Mohammad Esmalifalak, Toronto (CA); Akshay Iyengar, Toronto (CA); Seyedmorteza Mirhoseininejad, Toronto (CA); Peter Doulas, Toronto (CA); Francis Emery, Toronto (CA); Taylor Mathewson, Toronto (CA); William Hogan, Toronto (CA); Min Hua Yu, Toronto (CA)

(73) Assignee: FIIX INC., Toronto (CA)

( * ) Notice: Subject to any disclaimer, the term of this patent is extended or adjusted under 35 U.S.C. 154(b) by 273 days.

(21) Appl. No.: 17/384,181

(22) Filed: Jul. 23, 2021

(65) Prior Publication Data
US 2023/0027594 A1 Jan. 26, 2023

(51) Int. Cl.
*G06Q 10/20* (2023.01)
*G06N 5/04* (2023.01)
(Continued)

(52) U.S. Cl.
CPC .............. *G06Q 10/20* (2013.01); *G06N 5/04* (2013.01); *G06N 20/00* (2019.01); *G06Q 10/0635* (2013.01); *G06Q 10/0875* (2013.01)

(58) Field of Classification Search
None
See application file for complete search history.

(56) References Cited

U.S. PATENT DOCUMENTS

| | | | | |
|---|---|---|---|---|
| 5,970,437 A * | 10/1999 | Gorman | .................. | G06Q 10/06 700/83 |
| 2002/0010615 A1* | 1/2002 | Jacobs | .................. | G06Q 10/10 705/7.15 |

(Continued)

FOREIGN PATENT DOCUMENTS

WO     2021/050790 A1    3/2021

OTHER PUBLICATIONS

Vrunda Negandhi, Lakshminarayanan Sreenivasan, Randy Giffen, Mohit Sewak and Amaresh Rajasekharan; IBM Predictive Maintenance and Quality 2.0 Technical Overview; Jun. 29, 2015; IBM. ISBN-10: 0738454257 (Year: 2015).*

(Continued)

*Primary Examiner* — Cory W Eskridge
(74) *Attorney, Agent, or Firm* — Amin, Turocy & Watson, LLP

(57) ABSTRACT

An industrial work order analysis system applies statistical and machine learning analytics to both open and closed work orders to identify problems and abnormalities that could impact manufacturing and maintenance operations. The analysis system applies algorithms to learn normal maintenance behaviors or characteristics for different types of maintenance tasks and to flag abnormal maintenance behaviors that deviate significantly from normal maintenance procedures. Based on this analysis, embodiments of the work order analysis system can identify unnecessarily costly maintenance procedures or practices, as well as predict asset failures and offer enterprise-specific recom- (Continued)

mendations intended to reduce machine downtime and optimize the maintenance process.

20 Claims, 16 Drawing Sheets

(51) Int. Cl.
*G06N 20/00* (2019.01)
*G06Q 10/0635* (2023.01)
*G06Q 10/0875* (2023.01)

(56) References Cited

U.S. PATENT DOCUMENTS

| | | | |
|---|---|---|---|
| 2003/0229509 A1* | 12/2003 | Hall | G06Q 30/0278 705/305 |
| 2004/0260668 A1* | 12/2004 | Bradford | G06Q 10/06311 |
| 2009/0125368 A1* | 5/2009 | Vujicic | G06Q 10/06311 706/47 |
| 2012/0173300 A1* | 7/2012 | Davenport | G06Q 99/00 705/500 |
| 2018/0121845 A1* | 5/2018 | Bojovschi | G06Q 10/0635 |
| 2019/0156298 A1* | 5/2019 | Ethington | G06Q 10/0635 |
| 2021/0096824 A1 | 4/2021 | Stump et al. | |

OTHER PUBLICATIONS

D. Saxsena and M. Sathiyanarayanan, "Feature Selection Using Heterogeneous Data Indexes: a data science perspective," 2019 International Conference on contemporary Computing and Informatics (IC3I), Singapore, 2019, pp. 204-210, doi: 10.1109/IC3I46837.2019.9055648. (Year: 2019).*

K. Kulkarni, U. Devi, A. Sirighee, J. Hazra and p. Rao, "Predictive Maintenance for Supermarket Refrigeration Systems Using Only Case Temperature Data," 2018 Annual American Control Conference (ACC), Milwaukee, Wi, USA, 2018, pp. 4640-4645, doi: 10.23919/ACC.2018.8431901. (Year: 2018).*

Extended European Search Report received for European Patent Application Serial No. 22186342.6 dated Dec. 12, 2022, 8 pages.

Communication Pursuant to Rule 69 EPC received for EP Patent Application Serial No. 22186342.6 dated Jan. 30, 2023, 02 page.

* cited by examiner

FIG. 9

Work Order Insights

Analyzed Closed Work Orders 860

Risk Level

| Risk Type | Work Orders | Excess Duration | Excess Failures | Most Common Risk |
|---|---|---|---|---|
| High (5.2%) | 45 | 921.50 Days | 3 | Abnormal Configuration |
| Medium (26.0%) | 223 | 258.25 Days | 0 | Abnormal Delay |
| Low (68.8%) | 592 | 534.00 Days | 0 | Abnormal Configuration |

904

Site Health | Impact

Work Order Summary

| Site | High | Medium | Low | Excess Duration (Days) | Excess Failures | Most Common Risk |
|---|---|---|---|---|---|---|
| Toronto | 1 | 42 | 105 | 1.25 | 1 | Abnormal Configuration |
| New York | 0 | 13 | 41 | 0.00 | 0 | Abnormal Configuration |
| Dallas | 28 | 94 | 257 | 1168.50 | 1 | Abnormal Configuration |
| Los Angeles | 1 | 32 | 110 | 0.00 | 1 | Abnormal Failure |
| London | 15 | 42 | 92 | 543.00 | 1 | Abnormal Delay |

906

Toronto
High Risk Work Orders: 1

| Code | Description | Risk Score | Risk | Duration Days | Delay Days |
|---|---|---|---|---|---|
| S8291 | Noise From Motor | 955 | Abnormal Failure | 1.25 (0.50) | 0.00 (0.00) |

908

902

MACHINE LEARNING POWERED ANOMALY DETECTION FOR MAINTENANCE WORK ORDERS

BACKGROUND

The subject matter disclosed herein relates generally to industrial maintenance, and, more specifically, to industrial work order management.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system is provided, a clustering component configured to cluster the work order data into groups of work orders corresponding to respective types of maintenance operations; a z-scoring component configured to apply, for a group of work orders of the groups of work orders, statistical analysis that identifies one or more features of a work order, included in the group of work orders, that are anomalous relative to corresponding one or more features of other work orders included in the group of work orders; a risk score component configured to generate a risk score for the work order based on a number of the one or more features that are anomalous and identities of the one or more features, and to assign a risk level to the work order based on the risk score; and a user interface component configured to generate and render a work order report that displays the risk level for the work order.

Also, one or more embodiments provide a method, comprising clustering, by a system comprising a processor, work order data that defines closed work orders into groups of work orders corresponding to respective types of maintenance tasks; identifying, by the system based on statistical analysis applied to a group of work orders of the group of work orders, one or more features of a work order, included in the group of work orders, that are anomalous relative to corresponding one or more features of other work orders included in the group of work orders; and generating, by the system, a risk score for the work order based on a number of the one or more features that are anomalous and identities of the one or more features; assigning, by the system, a risk level to the work order based on the risk score; and rendering, by the system, a work order report that displays the risk level for the work order.

Also, according to one or more embodiments, a non-transitory computer-readable medium is provided having stored thereon instructions that, in response to execution, cause a system to perform operations, the operations comprising clustering work order data that defines closed work orders into groups of work orders corresponding to respective types of maintenance operations; identifying, based on statistical analysis applied to a group of work orders of the group of work orders, one or more features of a work order, included in the group of work orders, that deviate from corresponding one or more features of other work orders included in the group of work orders; generating a risk score for the work order based on a number of the one or more features that deviate and identities of the one or more features; assigning the work order to a risk level, of multiple defined risk levels, based on the risk score; and displaying, on a client device, a work order report that displays the risk level to which the work order is assigned.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 9 is an example interface display that can be generated by a work order analysis system to render work order analysis results on a client device.

DETAILED DESCRIPTION

Figure 1:
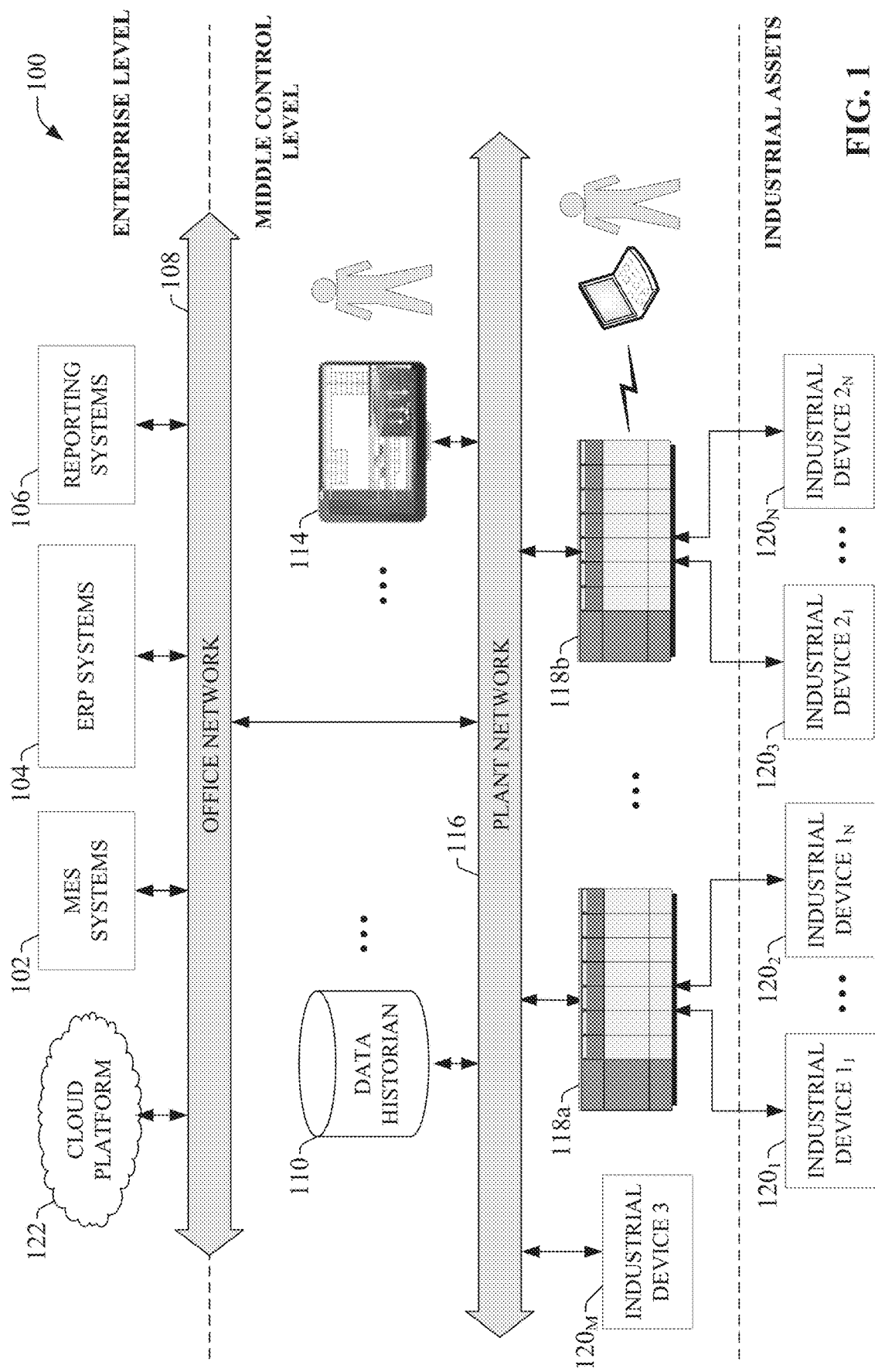
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers, their associated I/O devices, motor drives, and other such industrial devices are central to the operation of modern automation systems. Industrial controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial facilities typically house and operate many industrial assets, machines, or equipment. Many of these assets require regular proactive maintenance to ensure continued optimal operation, in addition to unplanned repair operations to address unexpected downtime events, such as machine malfunctions. To manage the large number of maintenance operations carried out at a given industrial enterprise, work order management systems can be used to initiate work orders for new maintenance operations to be performed and to track the statuses of these work orders. Maintenance technicians or managers fill out and submit work orders for respective maintenance operations or tasks to the system. A work order remains open as its corresponding maintenance task is performed, and is then closed once the task is completed.

However, the functionality of such work order management systems is typically limited to work order submission and crude status tracking, with no ability to offer higher-level insights into how well maintenance operations are being performed within a given industrial facility or across multiple facilities of an industrial enterprise. Moreover, the lifecycle of a work order is susceptible to errors at various levels, including errors in the submission process (e.g., due to improperly entered work order information), inefficient or noncompliant performance of the maintenance task itself, or entry of erroneous information when closing out a completed work order. Errors in the work order submission or closure process are common, and these errors may have some associated risks that directly affect the underlying industrial assets on which maintenance is performed, or that adversely affect future decisions made by the industrial enterprise. Such errors can include, for example, incorrect entry or selection of work order data during the submission process, or delayed closure of a completed work order. Meanwhile, errors in the performance of the maintenance tasks may lead to subsequent avoidable asset failures, and additional unscheduled maintenance operations to address these failures.

To address these and other issues, one or more embodiments described herein provide a work order analysis system that applies statistical and machine learning analytics to both open and closed work orders to identify problems and abnormalities that could impact manufacturing and maintenance operations. The analysis system applies algorithms to learn normal maintenance behaviors or characteristics for different types of maintenance tasks and to flag abnormal maintenance behaviors that deviate significantly from normal maintenance procedures. Based on this analysis, embodiments of the work order analysis system can identify unnecessarily costly maintenance procedures or practices, as well as predict asset failures and offer enterprise-specific recommendations intended to reduce machine downtime and optimize the maintenance process.

To these ends, one or more embodiments of the work order analysis system can group or cluster closed work orders based on their descriptions. This allows the system to compare work orders for a similar type of maintenance task (e.g., filter replacement, engine repair, oil change, machine cleaning, etc.). This clustering process can be performed for work orders across multiple sites or facilities. Since the system is language-agnostic, similar work orders can be clustered even if the work orders originated at different facilities or were submitted in different languages. Statistical analysis is then applied to work orders within a given cluster to identify any work orders that are anomalous in one or more respects; e.g., number of hours spent on the work, materials used, number of maintenance personnel who performed the work, etc. A risk type is then applied to any anomalous work orders discovered within the cluster based on the nature of the discovered anomaly. For example, if a work order is found to have been delayed longer than other work orders within its cluster, the system indicates that the work order represents an abnormal delay. The system then applies a risk score to each work order. The risk score is a metric of how much the work order differs from the others in its cluster and the impact that this deviation may have on operations.

Open or newly initiated work orders are also analyzed to identify work order features that were improperly entered or chosen during the submission process. The system continually reevaluates work orders to discover new anomalies so that if a work order becomes more risky over its lifespan—e.g., due to a change of its configuration or the amount of time the work order has been open—the work order is reclassified to reflect its new level of risk.

Figure 2:
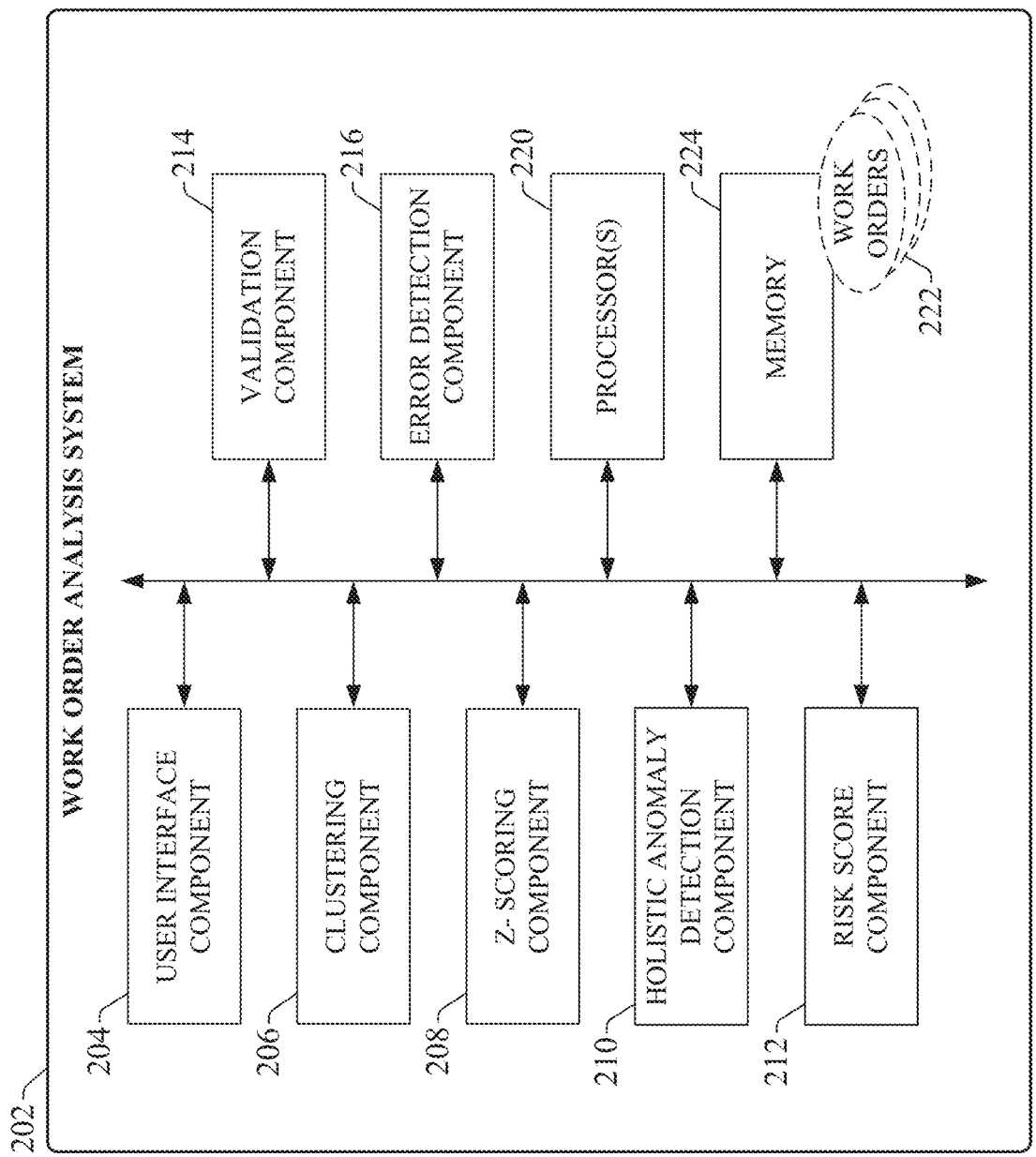
FIG. 2 is a block diagram of a work order analysis system.

FIG. 2 is a block diagram of a work order analysis system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Work order analysis system 202 can include a user interface component 204, a clustering component 206, a z-scoring component 208, a holistic anomaly detection component 210, a risk score component 212, a validation component 214, an error detection component 216, one or more processors 220, and memory 224. In various embodiments, one or more of the user interface component 204, clustering component 206, z-scoring component 208, holistic anomaly detection component 210, risk score component 212, validation component 214, error detection component 216, the one or more processors 220, and memory 224 can be electrically and/or communicatively coupled to one another to perform one or more of the functions of the work order analysis system 202. In some embodiments, components 204, 206, 208, 210, 212, 214, and 216 can comprise software instructions stored on memory 224 and executed by processor(s) 218. Work order analysis system 202 may also interact with other hardware and/or software components not depicted in FIG. 2. For example, processor(s) 220 may interact with one or more external user interface devices, such as a keyboard, a mouse, a display monitor, a touchscreen, or other such interface devices.

User interface component 204 can be configured to generate user interface displays that receive user input and render output to the user in any suitable format (e.g., visual, audio, tactile, etc.). In some embodiments, user interface component 204 can render these interface displays on a client device (e.g., a laptop computer, tablet computer, smart phone, etc.) that is communicatively connected to the work order analysis system 202 (e.g., via a hardwired or wireless connection). Input data that can be received via user interface component 204 can include, but is not limited to, work order data (e.g., work order data field entries), user interface navigation input, or other such input data. Output data rendered by user interface component 204 can include, but is not limited to, information regarding closed and open work orders, risk levels associated with respective work orders, estimated costs associated with high-risk work orders, or other such output data.

Clustering component 206 can be configured to cluster or group work orders submitted to the system 202 according to the type of maintenance job specified by the work orders (e.g., replacing a filter, repairing an engine, etc.). In some embodiments, clustering component 206 can apply machine learning to determine which work orders should be clustered together based on their determined similarities. Z-Scoring component 208 can be configured to perform analysis of the work orders in each cluster and identify features of any work orders within the cluster that differ significantly from corresponding features of other work orders in the cluster. Work order features that are assessed in this manner can include, but are not limited to, the estimated or actual number of hours required to complete the job, the number of people assigned to the job, materials used to complete the job, expenses associated with the job, a number of steps to be taken to complete the job, or other such factors. In some embodiments, z-scoring component 208 can apply statistical analysis to the work orders to determine which features, or combination of features, deviate from expected values of those features or combinations of features.

Holistic anomaly detection component 210 can be configured to perform a supplemental holistic analysis of the un-clustered work orders as a whole to identify potentially anomalous work orders that that may not have been identified by the cluster-specific analysis performed by the z-scoring component 208. This holistic analysis may involve, for example, applying one or more machine learning algorithms designed to identify work orders having one or more features, or feature combinations, that deviate notably from other archived work orders.

Risk score component 212 can be configured to generate, for each work order, a risk score indicating the work order's determined level of risk. The risk score for a given work order can be generated based on an aggregation of the work order's z-score(s), as generated by the z-scoring component 208, and an assessment of the work order relative to all other work orders as determined by the holistic anomaly detection component 210.

Validation component 214 is configured to apply a predictive analysis to open work orders in view of past work orders to determine whether any user-defined features of newly opened work order are likely to be underestimated or overestimated. Error detection component 216 can be configured to The one or more processors 220 can perform one or more of the functions described herein with reference to the systems and/or methods disclosed. Memory 224 can be a computer-readable storage medium that stores computer-executable instructions and/or information for performing the functions described herein with reference to the systems and/or methods disclosed. Memory 224 can also store the work order data submitted by users as work orders 222.

Figure 3:
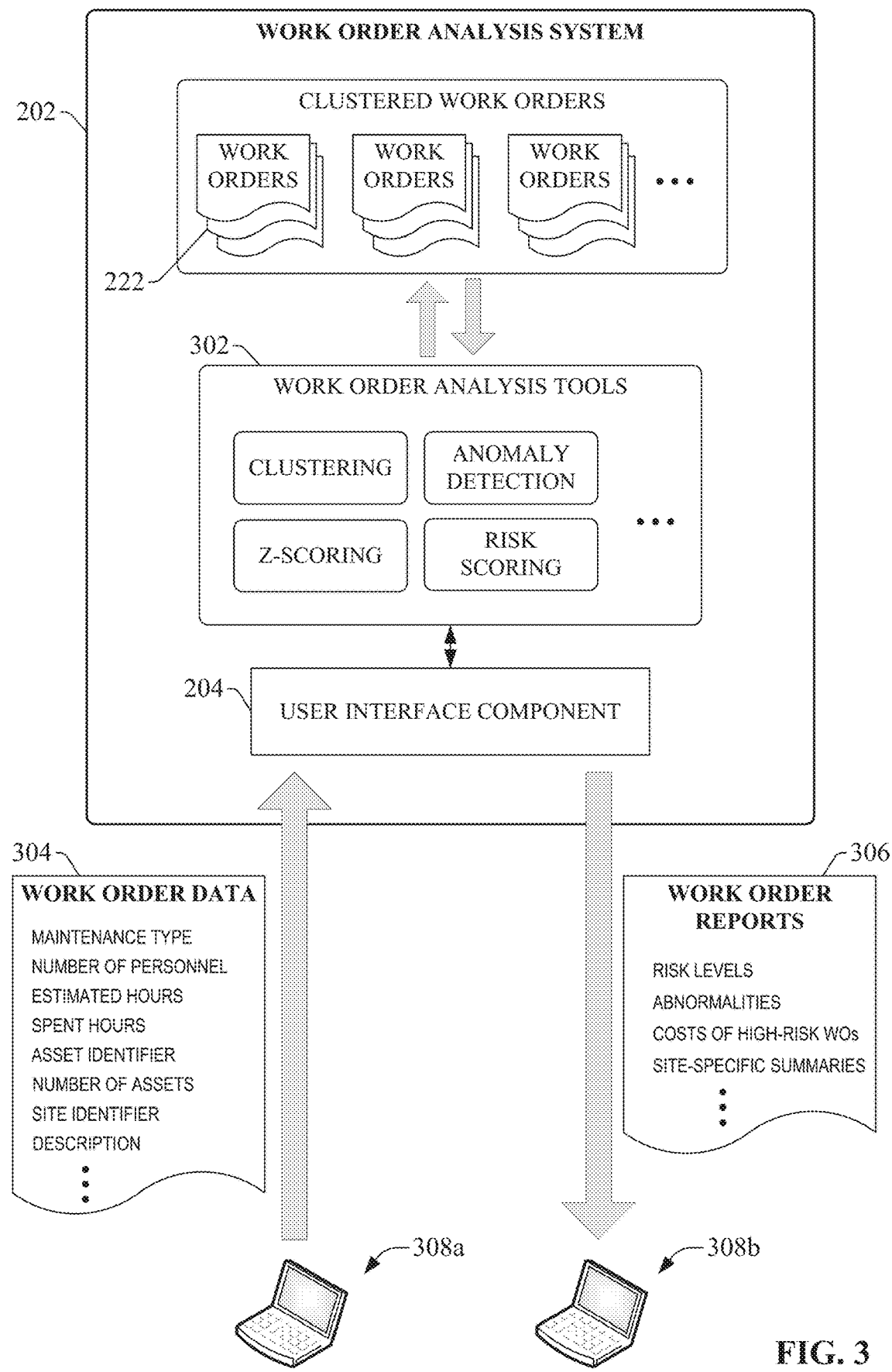
FIG. 3 is a diagram illustrating a general high-level architecture of a work order analysis system.

FIG. 3 is a diagram illustrating a general high-level architecture of the work order analysis system 202 according to one or more embodiments. Work order analysis system 202 can be implemented on any suitable platform that allows the system 202 to be accessed via client devices 308 (e.g., desktop computers, laptop computers, smart phones, tablet computers, wearable computing devices, etc.). For example, system 202 can be installed and executed on an on-premise server device on a plant or office network of an industrial facility. Alternatively, system 202 can be executed on a cloud platform as a set of cloud-based services, allowing users at different industrial facilities to access the system 202 and submit work orders, view work orders, or retrieve work order analysis results. System 202 can also be executed on a public network such as the internet and made accessible to users having suitable authorization credentials. In such embodiments, the system 202 can maintain work orders for different industrial enterprises in a segregated manner, such that employees of a given industrial enterprise can only access work orders and associated analysis results associated with that enterprise.

The user interface component 204 can allow client devices 308a to communicatively interface with the work order analysis system 202 and submit work order data 304. This work order data 304 can represent either a newly initiated work order for a maintenance task to be performed, or updated information for an open work order that was previously submitted to the system 202. Substantially any work order format can be supported by various embodiments of work order analysis system 202. In this regard, user interface component 204 can generate and deliver, to the client device 308a, user interface displays that render editable data fields representing features of the maintenance job represented by the work order. Items of work order data 304 that can be submitted to the system 202 in this manner can include, but are not limited to, a type of maintenance to be performed, a description of the maintenance, the number of personnel required to perform the maintenance, an estimated number of hours to perform the maintenance, an actual number of hours spent on the job, identities and numbers of industrial assets that are subject to the maintenance, identities of industrial sites or facilities in which the maintenance takes place, materials to be used to perform the job, an expected cost to perform the job (e.g., costs of replacement parts), or other such information.

The system 202 stores discrete sets of submitted work order data 304 as work orders 222 (e.g., on memory 224). Each work order 222 is classified as either an open work order representing a pending maintenance job to be performed on one or more industrial assets (e.g., machines, production lines, industrial devices, etc.) or a closed work order representing a maintenance job that has been completed.

In general, an industrial maintenance operation tends to be similar to other similar maintenance operations in terms of the steps performed, the time required to complete the maintenance operation, number of maintenance personnel required to complete the task, and other particulars. However, the same maintenance operation is also likely to be dissimilar from other types of maintenance. That is, a maintenance technician performing a particular maintenance task on an industrial asset should perform the task nearly identically to previous instances of the task performed on the same or similar assets. The maintenance technician may subsequently perform a separate, unrelated maintenance task that shares nothing in common with the first maintenance task. Work order analysis system 202 takes this heterogeneous nature of industrial maintenance operations into consideration when analyzing work orders 222 to determine high-risk maintenance operations and potential costs associated with these operations.

To this end, system 202 supports a set of work order analysis tools 302 that group work orders 222 representing similar types of maintenance operations into work order clusters and performs various types of statistical and machine learning analysis to the individual clusters as well as to the totality of the work orders 222 in a holistic manner Based on results of these analyses, system 202 identifies anomalous work orders 222 and generates insights into potential maintenance inefficiencies that, if corrected, may improve asset performance, increase machine uptime, reduce maintenance costs, reduce the amount of re-work currently being performed, improve maintenance efficiency, or mitigate equipment failures. User interface component 204 can render results of these analytics as work order reports 306 delivered to client devices 308b having appropriate authorization credentials to access the reports. In various embodiments, these reports 306 can classify work orders 222 based on their risk levels (e.g., high, medium, and low risk), identify the types of risk associated with respective work orders (e.g., abnormal delay, abnormal configuration, etc.), quantify costs associated with high-risk work orders 222 (e.g., amount of excess duration to complete a maintenance task, number of excess failures, etc.), render site-specific summaries that facilitate comparison of maintenance performance across multiple facilities of an industrial enterprise, or provide other such information.

Figure 4:
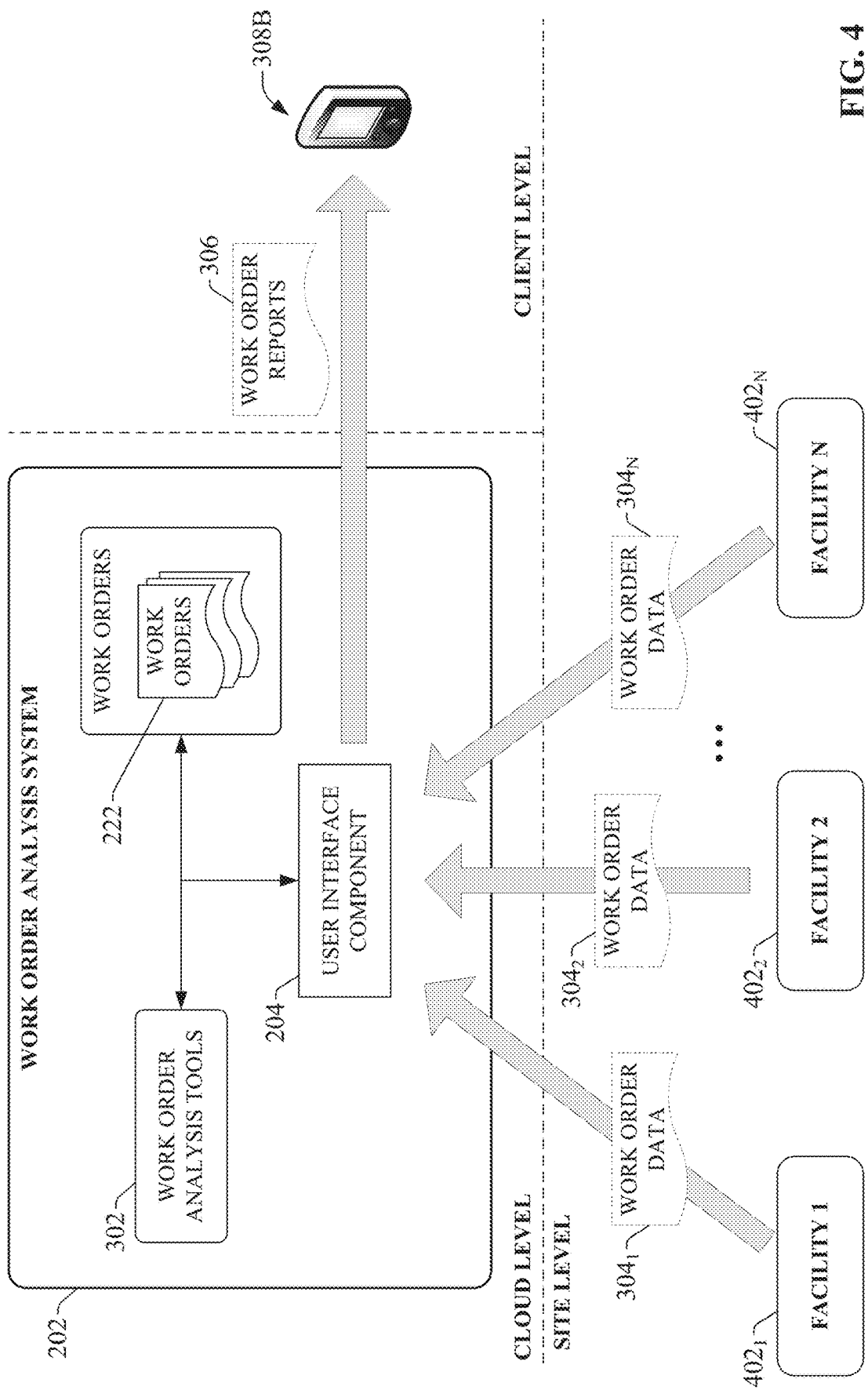
FIG. 4 is a diagram illustrating a generalized architecture in which a cloud-based work order analysis system generates work order reports based on geographically diverse industrial facilities.

Embodiments of work order analysis system 202 that are implemented on a cloud platform or public network can accept work order data 304 submitted from multiple facilities of an industrial enterprise for collective analysis and generation of site-specific summaries FIG. 4 is a diagram illustrating a generalized architecture in which a cloud-based work order analysis system 202 generates work order reports 306 based on geographically diverse industrial facilities. In this example, an industrial enterprise comprises N industrial facilities $402_1$-$402_N$ at respective different geographic locations. Users at each of the facilities 402 submit work order data 304 to the cloud-based system 202 for maintenance tracking, anomaly detection, and risk assessment, as described above. System 202 can cluster the work orders 222 received from the multiple facilities 402 according to types of maintenance, such that at least some clusters include work orders 222 from more than one facility 402. This allows work orders 222 for a particular type of maintenance operation performed at multiple different facilities to be analyzed collectively to identify anomalies or high-risk work orders 222.

Also, since each submitted work order 222 identifies the facility 402 from which the work order 222 was submitted, the work order analysis system 202 can generate site-specific work order summaries for inclusion as part of the work order reports 306. System 202 can also perform comparative analysis across the different facilities 402 based on their separate sets of work orders 222 and include indications of how well or how poorly maintenance operations are being performed at the respective facilities 402 relative to one another.

Embodiments of work order analysis system 202 can perform anomaly detection and risk analysis on both closed work orders 222 representing maintenance operations that have been performed to completion, as well as open work orders 222 representing newly initiated or pending maintenance requests. As will be described in more detail herein, system 202 applies different analytic processing to these two categories of work orders 222 and provides different types of feedback for closed and open work orders 222. FIGS. 5-8 illustrate example analytic processing that can be performed on closed work orders 222a by work order analysis system 202 according to one or more embodiments. Example analytic processing that can be applied to open work orders 222b will be described in connection with FIG. 10.

Figure 5:
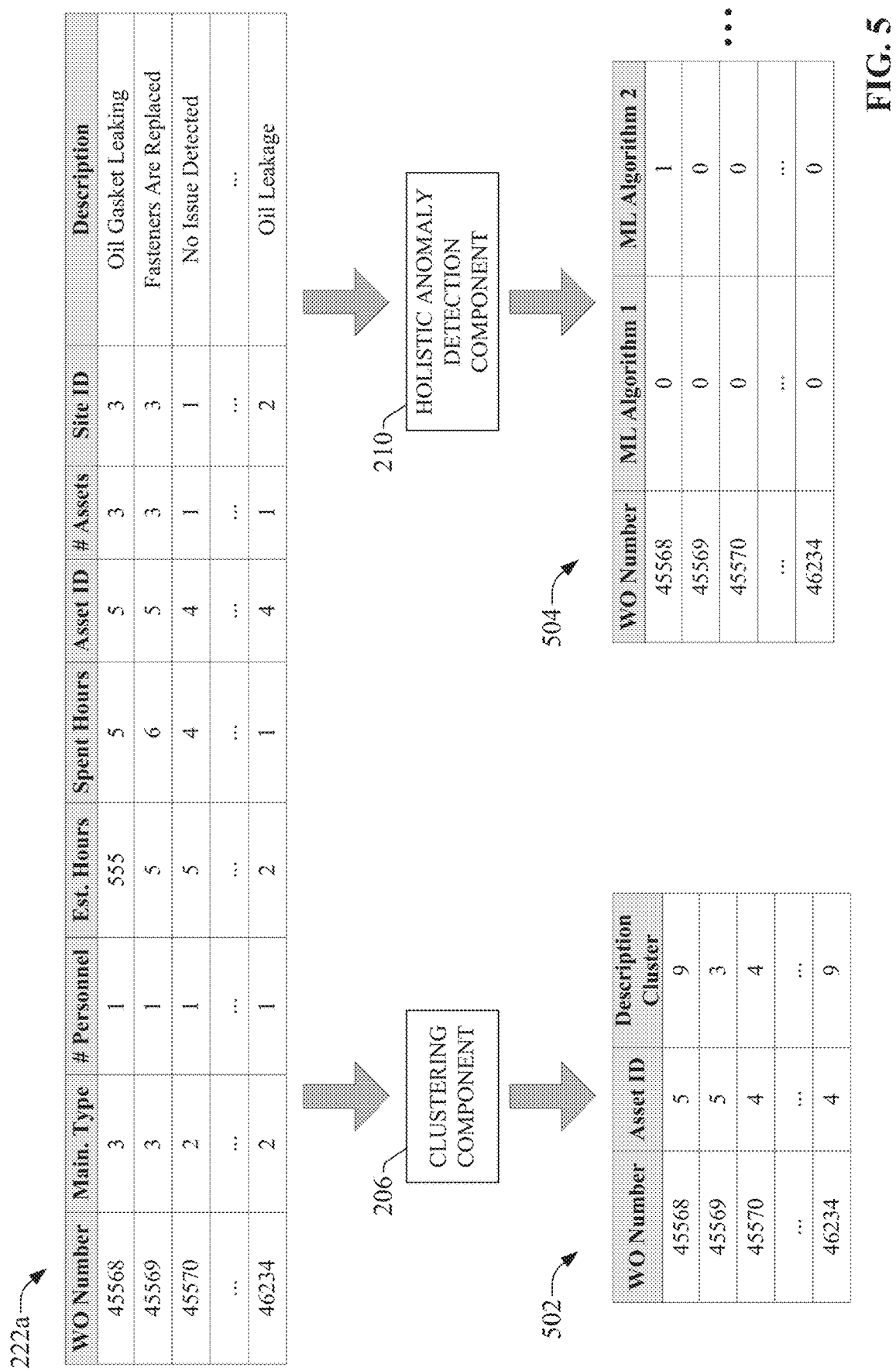
FIG. 5 is a data flow diagram illustrating clustering of closed work orders according to job similarity, as well as holistic detection of anomalies among the closed work orders.

FIG. 5 is a data flow diagram illustrating clustering of closed work orders 222a according to job similarity, as well as holistic detection of anomalies among the closed work orders 222a. As noted above, work orders 222 are stored on the system 202 and represent maintenance operations that were requested, scheduled, and performed. Each work order 222 comprises a set of data fields corresponding to respective features of the maintenance operation. Values of these data fields are submitted by the user (as work order data 304) when the work order 222 is initiated and may be updated as the maintenance operation is being performed to reflect updated statues of the job (e.g., time spent on the work to date, number of maintenance personnel working on the job, etc.).

In the illustrated example, the data fields that make up a work order 222 include a WO Number field that specifies a unique identifier of the work order, a Maintenance Type field that records a numerical value corresponding to a general category of maintenance to be performed, a Number of Personnel field that specifies a number of maintenance personnel assigned to complete the maintenance operation, an Estimated Hours field that specifies an estimated number of hours to complete the work, a Spent Hours field indicating the number of hours spent to date on the maintenance operation, an Asset ID field identifying the industrial asset (e.g., machine, production line, device, etc.) that is subject to the maintenance operation, a Number of Assets field specifying the number of industrial assets affected by the maintenance operation, a Site ID field specifying the site or plant facility in which the maintenance is being performed, and a Description field containing a text description of the problem to be corrected, or an action performed, by the maintenance operation. This example work order format is only intended to be exemplary, and it is to be understood that the work order analysis described herein can be performed on work orders having other formats or data fields without departing from the scope of one or more embodiments. For example, some work orders 222 may include data fields for a monetary cost associated with a maintenance operation (e.g., costs of replacement parts, costs of materials, etc.), materials used to complete the maintenance operation, or other such work order features.

Values of some data fields, such as the WO number, may be generated automatically by the system 202 when the work order 222 is initiated. Other values are entered by a user via interface displays generated by the user interface component 204. For example, a work order initiation display generated by the user interface component 204 may comprise editable fields whose values can be set by the user when initiating a new work order 222. These values can then be submitted to the system 202 as work order data 304, and the system can create a new work order 222 using these submitted values. Users can view both open and closed work orders 222 via other suitable interface displays served by the user interface component 204. During the pendency of an open work order 222, users can update the values of some of the work order's data fields to reflect updated statuses of the maintenance operation (e.g., the updated number of hours spent on the maintenance operation).

Once the maintenance operation corresponding to an open work order 222 has been completed, an authorized user (e.g., a member of the maintenance staff or a maintenance manager) can change the state of the work order can from open to closed. The work order analysis tools 302 can apply a variety of machine learning and statistical analytics to these closed work orders 222a to identify anomalies and inefficiencies in an enterprise's maintenance processes, to quantify the costs of these inefficiencies, and to recommend changes to the maintenance processes that are likely to recover these costs. These analysis tools analyze historical work orders 222a to estimate ranges of expected or typical feature values for work orders corresponding to a specific type of maintenance operation. If observed values for one or more features of a work order 222a are not sufficiently similar to corresponding estimated values (e.g., within learned ranges of typical values), the system 202 flags the work order 222a as an anomaly for further investigation. Work order features that can be analyzed for deviations can include, for example, the time between creating and completing a work order, the site identifier, corresponding assets, the number of assets used, technicians involved in completing the work order, the recorded descriptions, or other features.

As an initial step in this analysis, the clustering component 206 analyzes all the closed work orders 222a recorded in the system 202 to identify work orders 222a that correspond to a similar type of maintenance operation, and groups work orders for similar types of maintenance operations into work order clusters. Clustering component 206 identifies work orders 222a that correspond to similar types of maintenance tasks based in part on the text of the Description fields of the work orders 222a. For example, based on an examination of the text entries in the Description fields of the work orders 222a, clustering component 206 can identify a subset of the work orders 222a whose Description fields indicate an oil change operation, and flag this subset of work orders 222a for inclusion in a common work order cluster corresponding to oil change operations. Clustering component 206 can identify multiple such sets of work orders 222a representing similar maintenance operations and categorize each set of similar work orders 222a into a work order cluster.

Since the text in the Description fields is typically entered by different users across different work orders 222a (e.g., by members of the maintenance staff responsible for the work order 222a), the language or syntax used in the Description fields may be different across different work orders 222a even if the type of maintenance operation is the same. Accordingly, before performing clustering analysis, the clustering component 206 can preprocess the work order data to normalize the language of the Description field across the work orders 222a so that comparable language is used for all work order descriptions, allowing work orders 222a for similar types of maintenance operations to be more readily identified. Clustering component 206 can apply natural language processing tools to the text in the Description fields so that work order descriptions that are semantically similar to one another can be identified. For example, clustering component 206 may determine that the descriptions of work orders 45568 and 46234 in FIG. 5—"Oil Gasket Leaking" and "Oil Leakage"—suggest that both of those work orders relate to repair of oil leaks, and therefore belong in the same cluster, even though the semantics of those descriptions are not similar, since both descriptions contain key words suggestive of that maintenance operation.

In some embodiments, clustering component 206 can define the discovered work order clusters by assigning a cluster number to each work order 222a. Table 502 is an example data table in which the clustering component 206 has associated a Description Cluster number to each work order number. The Description Cluster number identifies the cluster to which the corresponding work order belongs. In the example depicted in FIG. 5, work orders 45568 and 46234 are both assigned to cluster 9 (repairing an oil leak), work order 45569 is assigned to cluster 3 (replacing fasteners), and work order 45570 is assigned to cluster 4 (no issue detected). Each Description Cluster number corresponds to a particular type of maintenance operation and is used to flag work orders 222a that relate to that type of maintenance operation. Work orders 45568 and 4623 are both assigned to the same cluster (cluster 9) corresponding to oil leak repair even though the text in the Description fields of those two work orders are not identical. In this instance, cluster component 206 has determined that the text of both Description fields relate to repair of oil leaks and has assigned both work orders to the same cluster accordingly.

Once the heterogeneous collection of closed work orders 222a have been grouped into clusters of homogeneous work orders, further statistical and/or machine learning analysis can be applied to the resulting work order clusters. In general, a particular type of maintenance operation (e.g., changing an oil filter, performing a machine change-over to produce a different type of part, etc.) performed on the same or similar types of industrial assets should be performed in a relatively consistent manner in each case, in terms of the time spent performing the maintenance, the number of maintenance personnel applied to the job, the materials used, and other features of the task. Therefore, work orders 222a within a given cluster having one or more features that deviate significantly from corresponding features of other work orders 222a in the same cluster may suggest inefficiencies in the manner in which the maintenance operation was performed for those deviant work orders. To identify such anomalous work orders, system 202 can apply statistical analysis to each work order cluster to identify any work orders 222a having features that deviate from expectations (e.g., in excess of defined thresholds).

Figure 6:
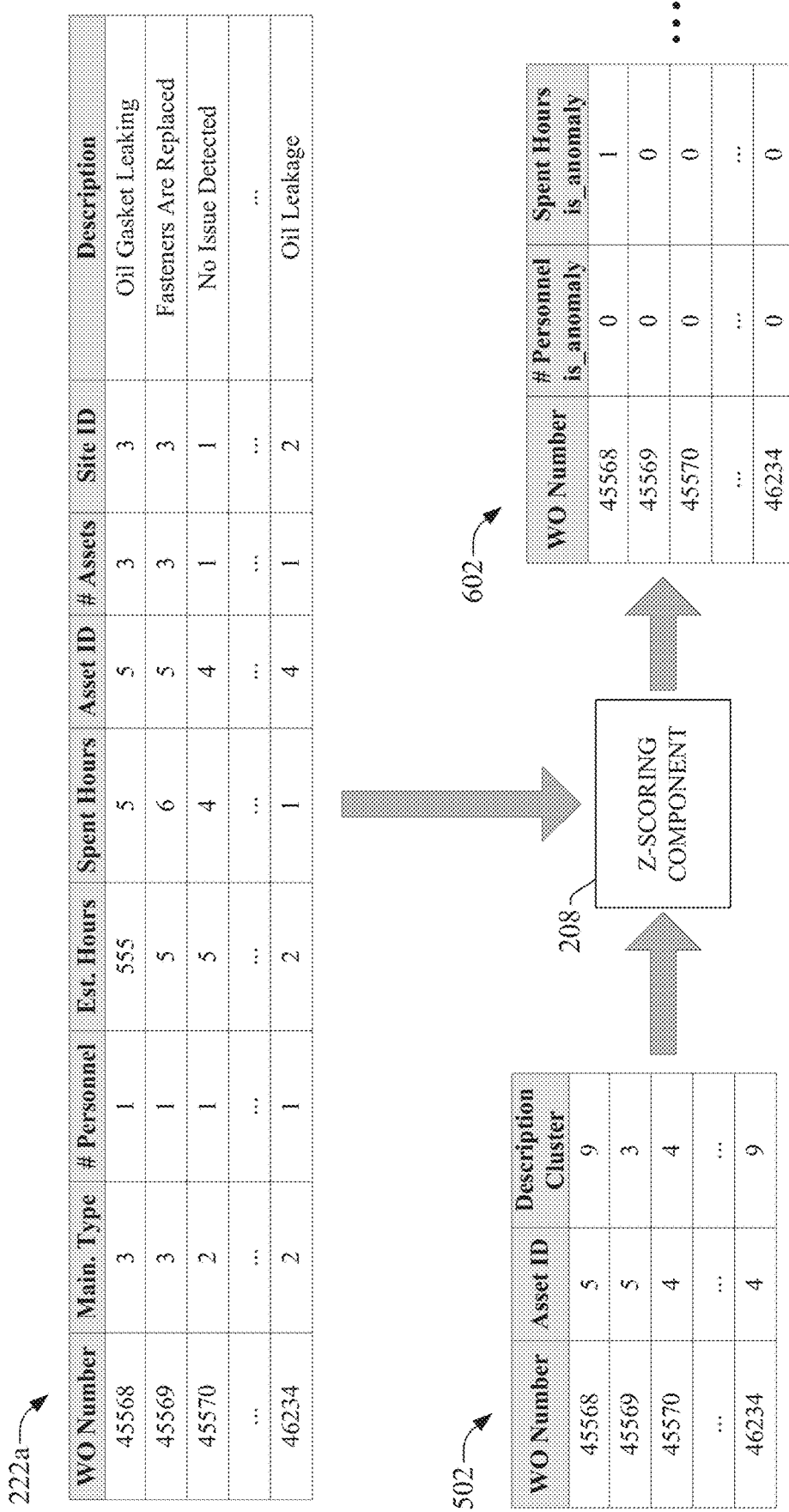
FIG. 6 is a data flow diagram illustrating assignment of z-scores to features of work orders by a z-scoring component.

In some embodiments, work order analysis system 202 can apply statistical analysis to work orders within each cluster to discover anomalous work order features and to flag these anomalous features using z-scores. FIG. 6 is a data flow diagram illustrating assignment of z-scores to features of each work order 222 by the system 202 according to one or more embodiments. To each cluster of work orders 222a representing similar types of maintenance operations, a z-scoring component 208 applies statistical analysis to learn, for each variable work order feature (data field value), a range of normal or typical values of that feature, and to identify significant deviations from these expected ranges among the features of the clustered work orders. Work order features examined in this manner correspond to data fields of the work order (e.g., number of personnel, hours spent, etc.). For example, for a work order cluster comprising work orders for oil change operations, z-scoring component 208 can apply statistical analysis to learn typical or expected values—or ranges of values—for the number of maintenance personnel used to perform the job, the amount of time spent to perform the job, materials used on the job, money spent on job, or other such work order features.

As depicted in FIG. 6, z-scoring component 208 performs this statistical analysis on the set of work orders 222a with reference to the Description Cluster number for each work order 222a, such that each work order 222a is analyzed and compared only with other work orders 222a having the same Description Cluster number. This ensures that anomalous work order features are identified based on their deviation from corresponding features of other work orders within the same cluster; that is, other work orders for a similar type of maintenance operation. Based on results of the statistical analysis, z-scoring component 208 generates a z-score—either 0 or 1—for each feature of each work order 222a based on a determination of whether that feature deviates, to a significant degree, from corresponding features of other work orders 222a having the same Description Cluster number. A z-score of 0 indicates that the feature—that is, the value of the data field corresponding to the feature—falls within the typical or expected range of values for that feature. A z-score of 1 indicates that the feature deviates from the expected range of values for that feature and is therefor anomalous. Table 602 illustrates a partial range of results of this z-scoring analysis for the example set of work orders 222a. As shown in this table 602, features of each work order 222a—e.g., the number of personnel, the number of hours spent, etc.—are assigned z-scores to indicate which features, if any, deviate from expectations for the type of maintenance operation represented by the cluster to which the work order is assigned.

In the example depicted in FIG. 6, z-scoring component 208 has determined that the number of hours spent to complete work order 45568 (as indicated by the value of that work order's Spent Hours field) is abnormally high relative to the number of hours typically spent performing a similar maintenance operation (repairing an oil leak). Based on this assessment, z-scoring component 208 has assigned a z-score of 1 to the Spent Hours feature of work order 45568. Flagging this feature of the work order can convey to management personnel that the maintenance process that was performed to complete the work order should be reviewed to determine the reason for the excessive amount of time spent. Reasons for the excessive time spent on the work order may be, for example, discovery of an unexpected and unrecorded problem by the maintenance team while repairing the oil leak, inexperienced maintenance personnel assigned to the job, or other such causes of delay.

In some scenarios, the procedure used to carry out a certain type of maintenance operation may also depend on the particular industrial asset being subjected to the maintenance operation. For example, the procedure for changing the oil in one machine may be different than the procedure for changing the oil in a different machine. For such maintenance operations, the z-scoring component 208 may further group the work orders within a given cluster based on the value of the Asset ID field, such that sub-clusters are created based on the combination of the Description Cluster and Asset ID values. This ensures that work orders representing a type of maintenance operation whose execution depends on the equipment on which the maintenance is performed are only compared with other work orders having the same Description Cluster value (representing the maintenance operation) and Asset ID value (representing the asset, machine, or equipment). Other such sub-groupings may also be created and analyzed by the system 202 if other features of the work orders are known to have an impact on how the maintenance operation is to be performed. For example, some types of maintenance tasks—e.g., cleaning a machine—may be performed differently depending on the industrial facility or site in which the task is being performed. Accordingly, the system 202 can create sub-groups as a function of the Site ID value within the clusters of work orders for that maintenance task, and perform the statistical z-scoring analysis on these sub-groups.

Some work order anomalies may not be detectable using cluster-specific statistical z-score analysis, since smaller clusters may not contain enough work orders to establish a reliable baseline of normal maintenance performance Consequently, work order features within these smaller clusters may be biased and contain abnormalities that are not recognized as anomalous relative to other work orders in the cluster. This may also be the case in scenarios in which a new maintenance group is practicing maintenance methods that constantly violate company protocols. The z-scoring component 208 may determine that work orders executed by this maintenance group are within safe limits since the baseline range of normal maintenance performance cannot be established due to the extreme variability in the way the maintenance is carried out. To capture such work order anomalies that may not be detectable using the cluster-based statistical analysis described above, work order analysis system 202 can also perform a supplemental holistic analysis of the unclustered set of work orders 222a as a whole.

Returning to FIG. 5, system 202 can include a holistic anomaly detection component 210 configure to perform this holistic anomaly detection analysis on the entire set of closed work orders 222a. In some embodiments, holistic anomaly detection component 210 can apply one or more different machine learning algorithms to the entire set of recorded closed work orders 222a, with each machine learning algorithm designed to execute a different type of unsupervised machine learning (e.g., density estimation, clustering, visualization, projection, etc.). Each machine learning algorithm is designed to identify any work orders 222a having features or combinations of features that appear to render those work orders anomalous relative to the other work orders 222a.

In contrast to the cluster-based statistical analysis performed by the z-scoring component 208, the machine learning analysis performed by the holistic anomaly detection component 210 is applied to the entire set of closed work orders 222a as a whole rather than to separate clusters of similar work orders. In this regard, even though the total set of heterogeneous work orders 222a comprises work orders of different types of jobs performed on different assets, some features may still be recognized by the holistic anomaly detection component 210 as being anomalous relative to the majority of other work orders within the heterogeneous set.

In an example scenario, a work order for a job performed on a new machine may not be flagged as anomalous by the z-scoring component 208 due to the relatively small number of similar work orders available for that machine, which yields a small cluster on which to apply the statistical analysis carried out by the z-scoring component 208. This small work order cluster may not contain a sufficient amount of maintenance data to establish a reliable performance baseline for maintenance tasks performed on the machine. However, based on examination of the work order within the context of all recorded work orders 222a, one or more of the machine learning algorithms applied by the holistic anomaly detection component 210 may determine that the number of steps taken to carry out the work order exceeds that of most other work orders 222a to a significant degree. Those machine learning algorithms will therefore flag the work order as anomalous. In general, the machine learning algorithms can be trained to identify features—or combinations of features—of a work order that render that work order abnormal within the context of the heterogeneous collection of work orders 222a. This approach can also identify problematic or non-standard job description syntax entered by users within the Description fields.

Figure 7:
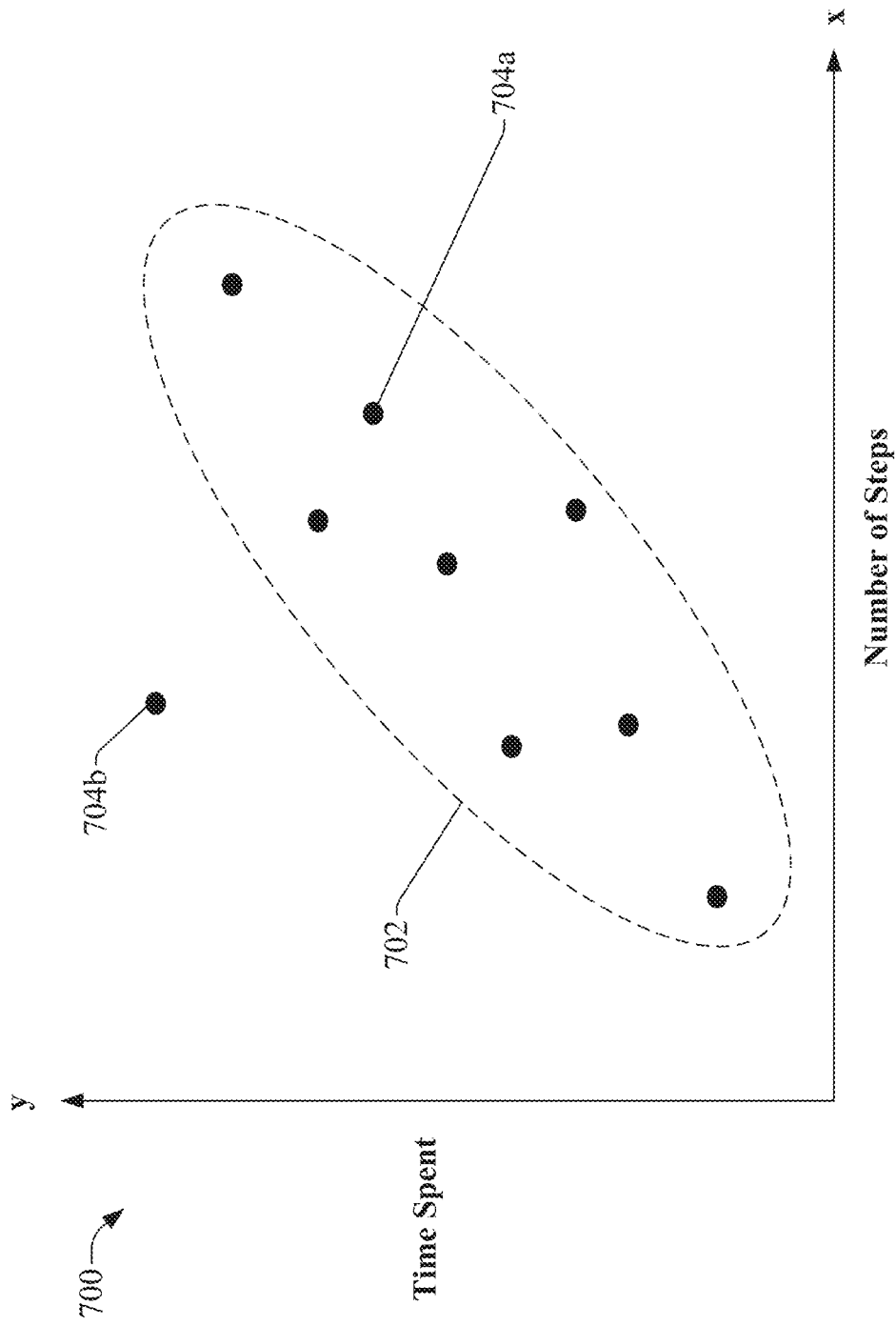
FIG. 7 is a two-dimensional graph that plots a first work order feature as a function of a second work order feature for multiple work orders.

By using machine learning to identify anomalous work orders, the holistic anomaly detection component 210 can identify not only single work order features that deviate from corresponding features of other work orders, but also combinations of features that appear to deviate from the expected feature space for that combination. To illustrate this, FIG. 7 is a two-dimensional graph 700 that plots a first work order feature as a function of a second work order feature for multiple work orders 222a. In this example, the first work order feature is the time spent performing the maintenance task, which is plotted on the y-axis. The second work order feature is the number of steps taken to carry out the maintenance task, which is plotted on the x-axis. Each plot point 704 on the graph 700 corresponds to one work order.

In general, there may be a broad correlation between the number of steps required to complete a maintenance operation and the total time spent to complete the maintenance (e.g., the more steps required, the greater the total time duration spent on the task). By performing machine learning analysis on the combinations of these two features for multiple work orders 222a, the holistic anomaly detection component 210 may learn that, for most work orders 222a, the relationship between the number of steps and the time spent on the task typically falls within the space defined by oval 702. That is, if the time spent on a work order is plotted against the number of steps required to complete that work order on graph 700, the resulting plot point—e.g., plot point 704a—will typically fall within oval 702. Based on this insight, the holistic anomaly detection component 210 may flag any work orders whose combination of total time spent and number of steps falls outside the feature space defined by oval 702, such as the work order represented by plot point 704b.

Although the example illustrated in FIG. 7 depicts a combination of only two work order features being examined, holistic anomaly detection component 210 can perform similar analysis across multiple combinations of work order features, including combinations of more than two features, in order to learn expected multi-dimensional feature spaces for these different combinations and to identify work orders whose combination of features fall outside the expected feature space for those combinations. In general, the machine learning applied by the holistic anomaly detection component 210 supplements the statistical analysis applied by the z-scoring component 208 by diversifying the analytic approaches applied to the work orders, ensuring that anomalous maintenance scenarios are not overlooked.

Returning to FIG. 5, table 504 is a partial example data table depicting results obtained by applying the machine learning algorithms to the set of work orders 222a by the holistic anomaly detection component 210. As noted above, some embodiments of holistic anomaly detection component 210 support multiple machine learning algorithms, each designed for a different specialty or type of machine learning. Based on its analysis of work orders 222a, each machine learning algorithm generates an anomaly detection score for each work order 222a indicating whether that machine learning algorithm has found the work order to be anomalous within the context of other work orders. A score of 0 indicates that the machine learning algorithm does not consider the work order anomalous, while a score of 1 indicates that the machine learning algorithm has identified the work order as being anomalous (e.g., due to an abnormal work order feature or a combination of features that fall outside the expected feature space). For each work order 222a, holistic anomaly detection component 210 generates a number of these anomaly detection scores equal to the number of machine learning algorithms that were applied by the holistic anomaly detection component 210, with each score being the output of one of the algorithms In the example depicted in table 504, work order 45568 has been flagged as being potentially anomalous by machine learning algorithm 2, while machine learning algorithm 1—which applies a different type of machine learning—has not found the work order to be anomalous.

Figure 8:
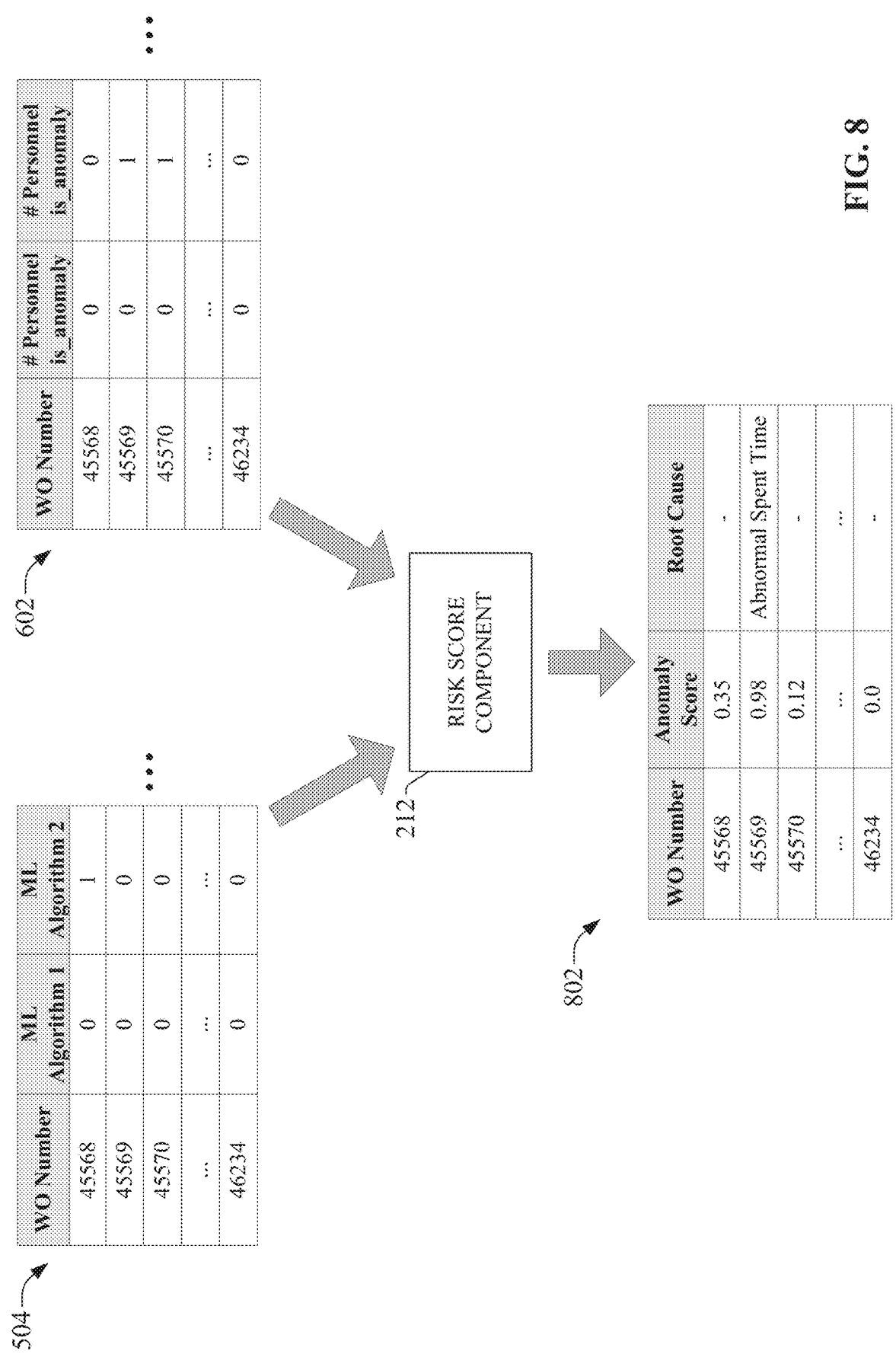
FIG. 8 is a data flow diagram illustrating generation of anomaly scores for respective work orders based on results of statistical and machine learning analysis.

Once the z-scoring component 208 has generated z-scores for each work order feature based on statistical analysis of each work order cluster (see table 602), and the holistic anomaly detection component 210 has generated anomaly detection scores for the work orders based on application of its machine learning algorithms to the total set of work orders 222a (see table 504), system 202 aggregates the results generated by the z-scoring component 208 and holistic anomaly detection component 210 to generate an aggregate anomaly score for each work order 222a. FIG. 8 is a data flow diagram illustrating generation of anomaly scores for respective work orders based on results of the statistical and machine learning analysis described above. The z-scores and anomaly detection scores can be considered votes cast by the z-scoring component 208 and the machine learning algorithms of the holistic anomaly detection component 210 as to whether each work order 222a is anomalous, and therefore merits further investigation. The risk score component 212 aggregates these votes for each work order 222a to obtain an aggregate anomaly score for each work order.

Table 802 depicts an assignment of anomaly scores to respective work orders as generated by the risk score component 212. In the illustrated example, the anomaly score generated by the risk score component 212 is a value between 0 and 1, with 1 indicating the highest level of certainty that the work order is anomalous and 0 indicating the highest level of certainty that the work order is not anomalous. Any suitable technique for aggregating the z-scores and holistic machine learning results to obtain an anomaly score is within the scope of one or more embodiments. For example, in some embodiments the risk score component 212 can generate the anomaly score for a given work order based on the total number of work order features that have been assigned z-scores of 1 by the z-scoring component 208 (see table 602), as well as the total number of machine learning algorithms that have flagged the work order as being possibly anomalous based on the holistic anomaly detection analysis (see table 504). In general, the more z-scores and holistic anomaly detection scores of 1 that have been assigned to a work order, the higher that work order's anomaly score will be. In some implementations, some features of a work order may be weighted higher than others, such that a z-score of 1 on those features will have a greater impact on the final anomaly score for the work order. Similarly, some machine learning algorithms applied by the holistic anomaly detection component 210 may be weighted more highly than others depending on the type of algorithm and its presumed accuracy with regard to anomaly detections. Accordingly, a positive anomaly detection result from these machine learning algorithms may have a greater impact on the final anomaly score than results of other machine learning algorithms.

In addition to calculating an anomaly score for each work order, risk score component 212 can also identify and record a root cause for any work order having an anomaly score sufficiently high to indicate a high risk. This root cause can be identified based on the features of the work order that were flagged as being anomalous by the z-scoring component. In the example depicted in table 802, work order 45569 has been assigned an anomaly score of 0.98, indicating a high level of anomalousness and risk. Risk score component 212 has also identified, based on the z-scores for the work order, that this work order's deviation was due to an abnormal amount of time spent completing the work. In general, the anomaly score conveys the intensity of the work order's deviation from expected maintenance performance, and the root cause indicates the reason for the deviation. This information can lead maintenance managers to problems in their enterprise's maintenance procedures or areas in which their maintenance personnel require additional training.

In some embodiments, the risk score component 212 can also identify possible underlying causes of high-risk work orders based on further analysis of those work orders. For example, risk score component 212 may determine that high-risk or deviant work orders for a particular type of job were all performed by the same maintenance team or at a particular plant facility, while also determining that other work orders for the same type of maintenance job performed by other maintenance teams or at other industrial facilities were performed within expectations. Based on this observation, the risk score component 212 can generate a recommendation that the procedures carried out by the maintenance team responsible for the high-risk work orders should be reviewed, or that the maintenance policies at the high-risk plant facility should be investigated.

Work order analysis system 202 can render results of the work order analysis described above as work order reports 306 via suitable interface displays. FIG. 9 is an example interface display 902 that can be generated by user interface component 204 to render work order analysis results on a client device according to one or more embodiments. This example interface display 902 includes a Risk Level section 904, a Site Health section 906, and a Site Detail section 908.

The Risk Level section 904 summarizes work order performance for a specified period of time (e.g., the past week, the past day, the past month, etc.). In the illustrated example, Risk Level section 904 categorizes the examined work orders into three risk types—low risk, medium risk, and high risk—based on the degree to which performance of the work orders deviated from expected or typical performance. The categorization of a work order as being a low, medium, or high risk is determined based on the value of its anomaly score, as determined by the risk score component 212. In an example implementation, work orders having anomaly scores between 0 and 0.33 may be categorized as low risk, work orders having anomaly scores between 0.34 and 0.66 may be categorized as medium risk, and work orders having anomaly scores between 0.67 and 1 may be categorized as high risk. Under the Work Orders column, Risk Level section 904 can display the total number of work orders that have been assigned to each of the three risk levels. This offers viewers a high-level summary of how many maintenance jobs were performed in a manner that deviated from expectations for those types of jobs, and the degree to which the work orders were different from expected performance in one or more particulars (e.g., time spent on the job, number of personnel who worked on the job, materials or parts used on the job, etc.).

Under the Excess Duration column, the Risk Level section 904 can also display, for each risk level, a total excess duration associated with the work orders in that risk level. This excess duration value represents the estimated amount of excess time spent performing the maintenance operations due to the deviations in the way the maintenance operations were performed. In the illustrated example, the analysis system 202 has calculated that the 46 high risk work orders have cost an additional 921.50 days of maintenance time due to their deviations from expected performance. In some embodiments, the risk score component 212 can calculate these excess duration values based on the values of the Spent Hours fields of the work orders in each risk category relative to learned expected values of the Spent Hours fields of non-anomalous work orders for the same type of maintenance operation. The Excess Duration values provide a metric of how much the high-risk work orders are costing in terms of excess maintenance time or, stated differently, the amount of maintenance time that can be saved if the performance issues that cause the high-risk work orders are addressed and resolved.

Under the Excess Failures column, the Risk Level section 904 displays, for each risk category, a number of excess asset failures that could have been avoided if maintenance tasks had been performed differently. In some embodiments, the number of excess asset failures can be determined by one or both of the statistical analysis of individual work order clusters by the z-scoring component 208 or the machine learning analysis applied to the holistic set of work orders by the holistic anomaly detection component 210. For example, machine learning algorithms applied by the analysis system 202 may identify a work order for correcting a downtime event of a particular machine, where the downtime event may be attributable to a previous maintenance action performed on the machine that was not performed optimally. In this regard, the machine learning algorithms can learn correlations between anomalous work orders for repairing the machine—where the anomalous work orders are found to have been performed in a manner that deviates from learned expected performance of the maintenance task—and subsequent work orders for correcting downtime events of the machine that may not have occurred if the anomalous work order had been performed according to standard. In general, the number of excess failures represents the number of asset failures that may be attributable to non-compliant or non-standard maintenance performance.

Under the Most Common Risk column, the Risk Level section 904 indicates, for each risk category, the most common risk identified among the group of work orders within that risk category. In some cases, the most common risk for a given risk category may correspond to the work order feature that is found to deviate the most often among the group of work orders within that risk category. In other cases, the most common risk may be interpreted by the system 202 based on a combination of work order features that are found to frequently deviate from expectations. Example risks that can be indicated in this column can include, but are not limited to, abnormal delays, abnormal configurations, abnormal work durations, abnormal delays, or other such causes of risk.

Information displayed in the Site Health section 906 of interface display 902 may be similar to that displayed in the Risk Level section 904, but is segregated according to site or facility. In the example depicted in FIG. 9, the Site Health section 906 depicts work order risk information for five different facilities (Toronto, New York, Dallas, Los Angeles, and London). For each site, the Site Health section 906 displays the number of work orders in each risk category, the excess duration and failures caused by non-compliant work order performance, and the most common risk that contributes to anomalous work orders. Organizing work order insight information in this site-specific manner can readily convey which facilities of an industrial enterprise are performing maintenance tasks poorly or in a non-compliant manner, and which sites are carrying out maintenance tasks in a low-risk, low-cost manner.

Interacting with display 902 to select a site or facility in the Site Health section 906 can cause the high-risk work orders for the selected site to be listed in the site detail section 908 of the interface display. In the illustrated example, the Toronto site has been selected, causing information about that site's single high-risk work order to be displayed in section 908. For each high-risk work order, section 908 displays the work order number or code, the description of the work order (obtained from the work order's Description field), a risk score for the work order, the type of risk that the analysis system 202 has identified for the work order (e.g., abnormal asset failure, abnormal delay, abnormal duration, abnormal configuration, etc.), the duration of the work order, and the delay associated with the work order. Section 908 can display the duration and delay associated with the work order together with the expected duration and delay for similar types of work orders, as determined based on the statistical and/or machine learning analysis performed by the system 202 on other work orders for similar types of maintenance.

The risk score assigned to a high-risk work order is a key performance indicator (KPI) indicating how different the work order is from other work orders for similar types of maintenance. In this example, the risk score has a range between 0 and 1000, with 1000 indicating the maximum degree of deviation. The risk scores can be used to prioritize which maintenance procedures at each facility should be reviewed and corrected to obtain the most benefit in terms of asset performance and maintenance costs.

The interface display 902 depicted in FIG. 9 is only intended to be exemplary, and it is to be appreciated that results of the work order analyses described above can be rendered in any suitable format without departing from the scope of one or more embodiments of this disclosure.

The insights gleaned by embodiments of the work order analysis system 202 can afford maintenance and manufacturing personnel the ability to find areas of their operations that are underperforming or overperforming. The system 202 can also identify root causes or recommend paths to resolving maintenance inefficiencies identified by the statistical and machine learning analysis applied to past work orders. This allows maintenance teams to improve their processes and ultimately reduce maintenance or manufacturing costs. The work order analysis system 202 can also regularly re-evaluate the work orders 222 using the techniques described above as new work orders are submitted, completed, and closed, so that the algorithms used to generate risk scores and recommended countermeasures are regularly updated with new training data.

In addition to gleaning insights into an enterprise's maintenance processes and approaches by analyzing closed work orders 222*a* for past maintenance tasks, embodiments of the work order analysis system 202 can also examine newly initiated or open work orders for pending maintenance tasks to identify missing or incorrectly entered work order information, as well as to provide customized feedback regarding expected delays in performing open maintenance tasks based on past maintenance history. In general, after a work order for a planned or unplanned maintenance operation is created in the system 202, there may be unknown risks associated with the maintenance operation that prevent on-time closure of the work order. These risks can grow over time and during pendency of the maintenance operation, leading to losses in terms of machine runtime (e.g., due to delay in restoring a production line after a shutdown for maintenance) or additional time spent on maintenance.

Figure 10:
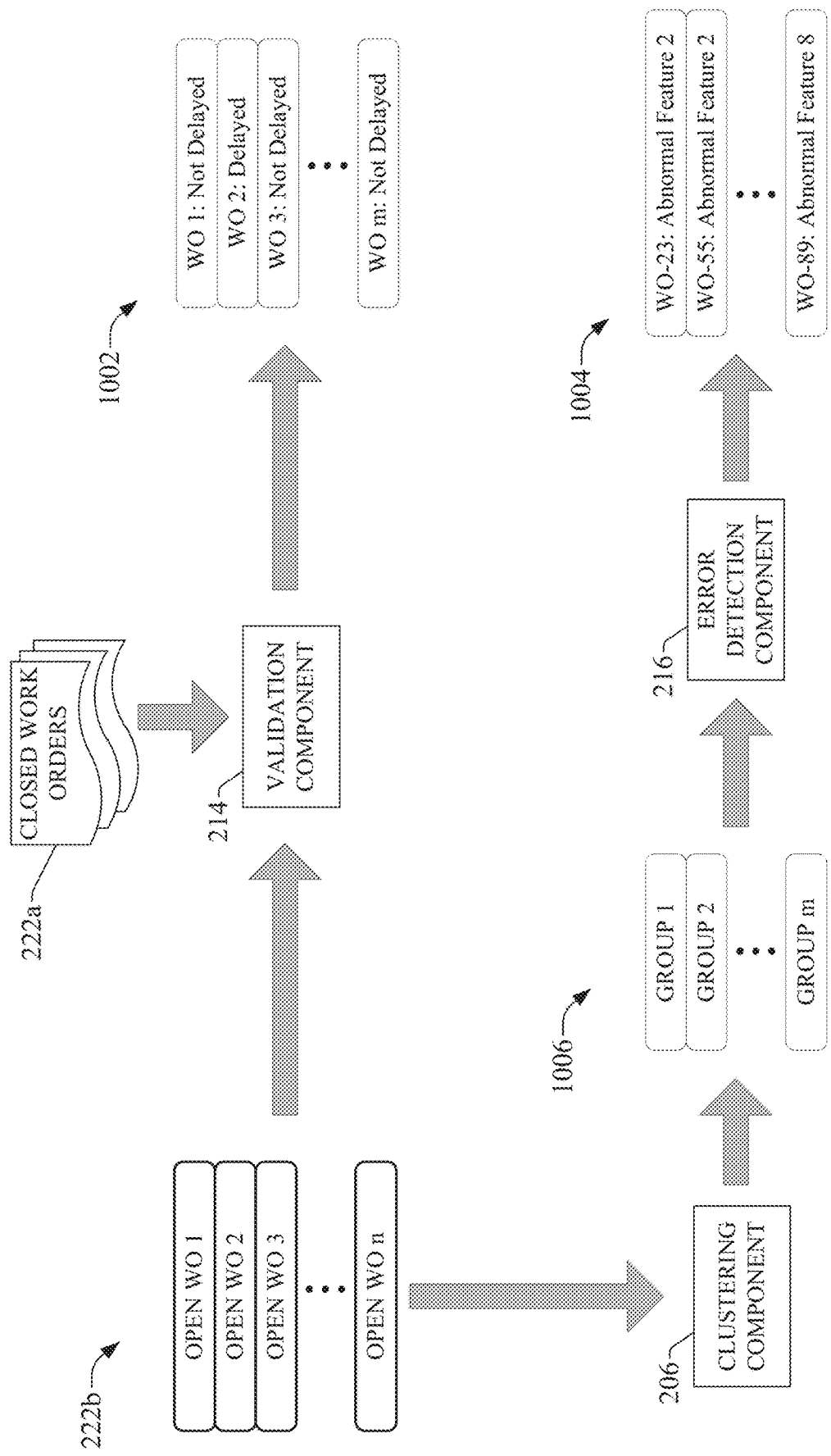
FIG. 10 is a data flow diagram illustrating analyses that can applied to open or pending work orders by a work order analysis system.

To address these issues, one or more embodiments of the work order analysis system 202 can apply classification-based algorithms that are trained using historical labeled data from past work orders to calculate the probability of future delays associated with an open work order. FIG. 10 is a data flow diagram illustrating analyses that can applied to open or pending work orders 222*b* by some embodiments of the work order analysis system 202. Open work orders 222*b* represent newly initiated or pending work orders for maintenance tasks that have yet to be completed. As described above, users can enter a new work order 222*b* for a task to be completed via interaction with suitable work order entry interface displays rendered by user interface component 204. These interactive displays allow the user to submit information about the maintenance operation to be performed by entering values for respective data fields of the work orders (e.g., description of the problem to be addressed by the maintenance, a type of maintenance, the number of personnel to be assigned to the task, the estimated number of hours to complete the task, identification of the industrial assets on which the task is to be performed, the industrial site or facility in which the task is to be performed, etc.).

When a new work order 222*b* is submitted to the system 202, a validation component 214 applies predictive analysis to the work order 222*b* in view of past work orders 222*a* to determine whether any user-defined features of the work order 222*b* are likely to be underestimated or overestimated. For example, if a submitted work order 222*b* includes a data field indicating an estimate of the number of hours that will be required to complete the maintenance operation, the validation component 214 can apply statistical and/or machine learning analysis to the new work order 222*b* within the context of similar past work orders 222*a* to determine whether similar maintenance operations performed on the same industrial asset (or same type of industrial asset) have required more or fewer hours to complete. In some embodiments, the analysis performed by the validation component 214 can be similar to one or more of the anomaly detection analyses performed on closed work orders 222*a* described above. In this regard, the validation component 214 can be trained, using the historical closed work orders 222*a*, to discover anomalies or inaccurate entries in new work orders 222*b* during the work order submission process.

For example, validation component 214 may apply statistical analysis to a subset of the available closed work orders 222*a* determined to correspond to a similar type of maintenance task as that of the new work order 222*b* (e.g., the same or similar job description performed on the same or similar industrial assets) to determine an expected range of time typically spent performing the task. If the expected amount of time to be spent on the new work order 222*b*, as entered by the user submitting the new work order 222*b*, is within this expected range, the validation component 214 can generate a confirmation that the expected time duration entered by the user is within expectations and that the maintenance operation is not expected to be delayed. Alternatively, if the expected time duration entered by the user is less than the minimum expected time duration as learned by the statistical analysis, the validation component 214 can generate an indication that the maintenance task is expected to be delayed, or to take longer than the user expects. If the expected time duration entered by the user is greater than the maximum amount of time spent on the task, the validation component 214 can generate a warning that the user may be overestimating the amount of time required to complete the maintenance operation. These various types of feedback can be displayed by the user interface component 204 during the work order submission process, affording the user an opportunity to revise features of the work order to bring those features within expectations if appropriate. In an example embodiment, the validation component 214 may render a list of statuses 1002 for each open work order 222*b* indicating whether that work order is expected to be delayed or not delayed relative to the expected number of hours entered by the user.

In addition to statistical analysis performed on the new work order 222*b* in view of similar past work orders 222*a*, some embodiments of validation component 214 may also perform holistic machine learning analysis on the new work order 222*b* together with the total set of past work orders 222*a* to identify whether a combination of features of the new work order 222*b* is anomalous. This approach can be useful, for example, for detecting maintenance procedure anomalies that are specific to certain industrial facilities. For example, similar maintenance tasks performed on similar types of industrial assets may vary in the amount of time required to complete those tasks depending on the facility at which the task is performed, since some maintenance teams at certain facilities may be more proficient at performing the maintenance task than others. Consequently, if a newly submitted work order 222*b* for performing the task at a first facility specifies, as the expected number of hours to be spent, a number of hours typically spent performing the task at a second facility with a more experienced maintenance team, the validation component 214 may indicate that the task should be expected to be delayed since the past work orders 222*a* indicate that the first facility typically takes longer to perform the task. Similarly, validation component 214 can identify tasks that typically take different amounts of time to complete depending on the day of the week or the month of the year, and generate an indication as to whether the user has overestimated or underestimated the amount of time required to complete the task if the user's estimation falls outside of expectations for these reasons.

In some embodiments, if the user's estimate of the amount of time required to complete the job falls outside of expectations, the validation component 214 can generate an indication of the typical amount of time spent on the maintenance task, and the user interface component 204 can render this information on the work order submission display during the work order submission process, thereby allowing the user to revise the estimate if desired. In some scenarios, the validation component 214 may also identify a reason that the maintenance task is expected to be delayed based on results of the statistical and/or machine learning analyses described above (e.g., less experienced maintenance team, day of the week or month of the year during which the task typically takes longer to perform, etc.), and the user interface component 204 can render this information as actionable feedback to the user. Based on this feedback, the user may choose to either revise estimates recorded on the work order 222*b* to align with expectations or modify the work order features to make up for the expected delays (e.g., by scheduling more maintenance personnel to the job, rescheduling the job to another time when the maintenance can be performed more quickly, etc.).

In addition to identifying new work order entries that deviate from expectations based on historical maintenance performance, some embodiments of analysis system 202 can also assess each open work order 222b against other similar open work orders 222b to identify possible data entry abnormalities. In an example approach, the clustering component 206 can cluster the currently open work orders 222b according to similar types of maintenance operations to yield open work order clusters or groups 1006. Clustering component 206 can cluster the open work orders 222b using similar grouping criteria used to cluster the closed work orders 222a, such that each resulting group 1006 of clustered work orders comprises only work orders 222b corresponding to a particular type of maintenance task or operation. An error detection component 216 can then analyze each open work order group 1006 to determine whether the group 1006 contains any open work orders 222b having one or more features (e.g., data field values) that deviate significantly from corresponding features of the other work orders 222b in that group. In some embodiments, the error detection component 216 can use z-scoring analysis similar to that carried out by the z-scoring component 208 on closed work orders 222a to identify anomalous data entries within open work orders of each group 1006. This approach can be used to identify improper work order data entries, including but not limited to descriptions of the work to be performed, estimated hours to complete the work, number of personnel assigned to the maintenance task, asset identifiers, or other such work order features. Error detection component 216 may also apply machine learning analysis to the work order groups 1006 to identify possible anomalous entries in some embodiments.

If any abnormal or anomalous work order features are detected using these approaches, the error detection component 216 can generate a list 1004 of possible abnormal features of one or more open work orders 222b, and this list 1004 can be rendered by the user interface component 204. For example, the user interface component 204 may generate a message indicating that Feature 2 (e.g., number of assigned personnel) of work order WO-23 appears to be abnormal, based on the number of personal typically assigned to the same type of maintenance operation, as learned based on statistical and/or machine learning analysis of the other open work orders 222a within the same group 1006. In this way, the analysis system 202 can offer substantially real-time feedback to a user in the process of submitting a new work order 222a, indicating whether the user's entries for any of the work order fields appears to be abnormal relative to the type of maintenance task being initiated. As in the case of closed work orders 222a, the error detection component 216 can consider not only the value of each individual feature relative to corresponding features of other work orders in the group, but also combinations of features that appear to be abnormal (e.g., an abnormally low estimated completion time for a task to be performed at a particular facility that has historically taken longer to complete the task than other facilities).

Embodiments of the work order analysis system 202 described herein can monitor both closed and open work orders and provide regular feedback to managers or operators, notifying of probable impaired work order entries or costly inefficiencies in an enterprise's maintenance procedures. The system 202 uses multiple data engineering methods to identify risky work orders, as well as to determine the severity of these high-risk work, possible causes of risk, and costs associated with these maintenance inefficiencies in terms of excessive maintenance duration, excessive asset failures, or other metrics.

FIGS. 11A-13 illustrate example methodologies in accordance with one or more embodiments of the subject application. While, for purposes of simplicity of explanation, the methodologies shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 11A:
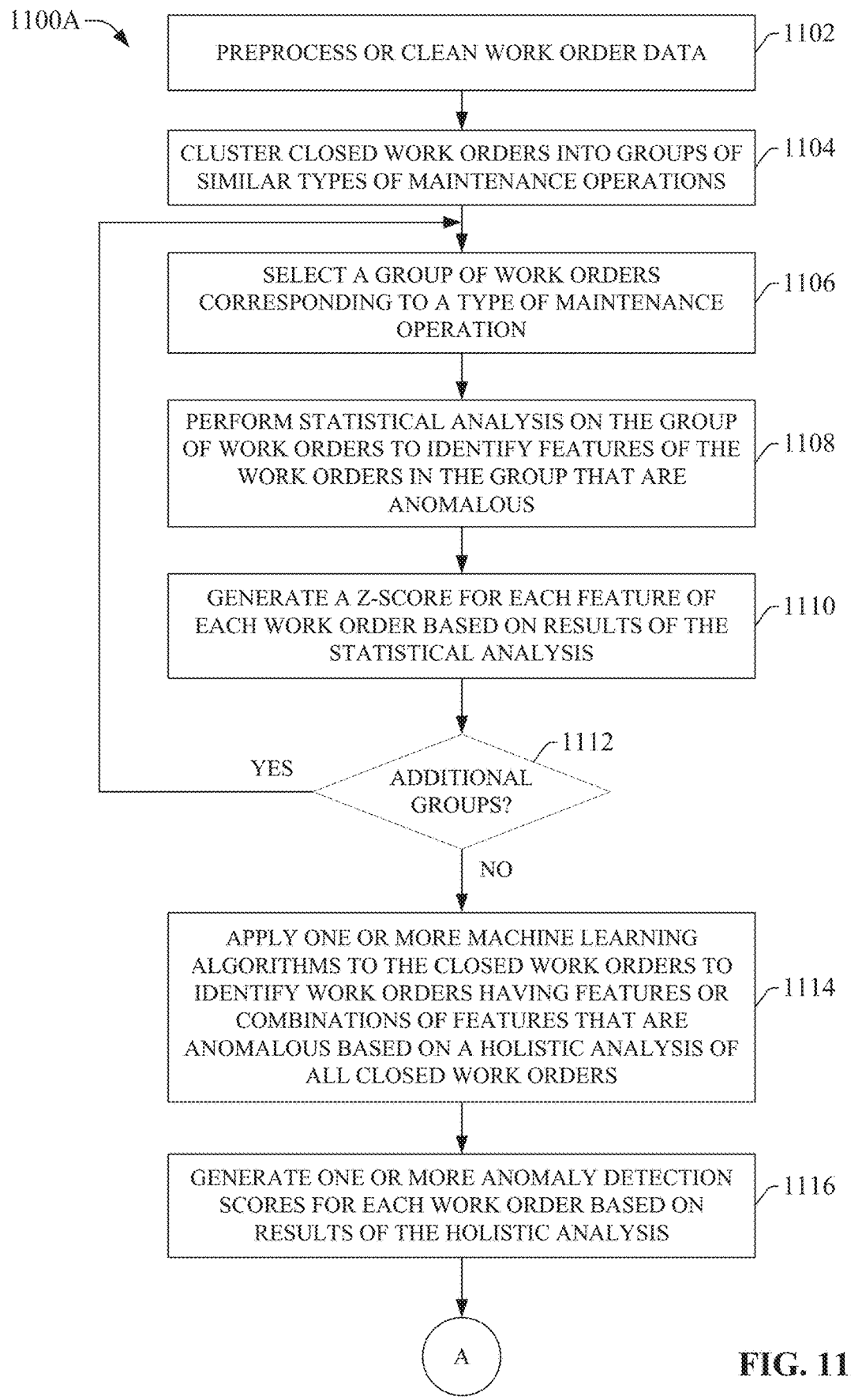
FIG. 11A is a flowchart of a first part of an example methodology for analyzing closed industrial work orders and generating risk reports based on the analysis.

FIG. 11A illustrates a first part of an example methodology 1100A for analyzing closed industrial work orders and generating risk reports based on the analysis. Initially, at 1102, work order data representing closed work orders stored in a work order management and analysis system is preprocessed or cleaned to correct grammar, translate the language of the work orders to a common language, replace missing values with statistically estimated values, or to perform other such preprocessing functions. At 1104, the closed work orders are clustered into groups of similar types of maintenance operations. In some embodiments, the work order analysis system can apply machine learning to identify subsets of the work orders that correspond to the same or similar types of maintenance operations or tasks (e.g., changing the oil in a particular type of industrial asset, repairing an oil leak, repairing fasteners, performing weekly preventative maintenance on a particular type of asset, cleaning a machine, or other types of maintenance tasks). This machine learning can examine the data fields that contain information about each work order to learn the various subsets of work orders that represent similar types of jobs, including but not limited to description fields, asset identifier fields, site identifier fields, maintenance type fields, or other such data items. Clustering the work orders in step 11042 yields multiple groups of work orders, with each group comprising a subset of the work orders corresponding to the same type of maintenance operation.

At 1106, one of the groups of work orders generated at step 1104 is selected. The selected group represents a particular type of maintenance operation, such that all work orders within the group correspond to instances of that maintenance operation that have been performed by maintenance personnel. At 1108, statistical analysis is performed on the group of work orders selected at step 1106 to identify, if any, features of the work orders that are anomalous. In an example embodiment, statistical analysis can be applied to the data fields of the cluster of work orders to learn, for each variable work order feature (e.g., hours spent on the maintenance, number of personnel who worked on the job, materials used, number of steps performed, expenditures on the job, etc.), a range of normal or typical values of that feature, and to identify significant deviations from these expected ranges among the features of the clustered work orders. At 1110, a z-score is generated for each feature of each work order in the cluster based on results of the statistical analysis performed at step 1108. Any features (e.g., data field values) of any work orders that are identified by this statistical analysis as deviating to a significant degree from learned typical ranges of values of those features can be flagged with a z-score of 1. Alternatively, work order features that are not found to be anomalous can be assigned a z-score of 0.

At 1112. a determination is made as to whether there are additional work order groups that have not yet been analyzed using the statistical analysis. If additional groups have not yet been analyzed (YES at step 1112), the methodology returns to step 1106, where the next group of work orders is selected, and steps 1106-1110 are repeated for the next group. When all groups have been analyzed and all features of each work order have been assigned z-scores (NO at step 1112), the methodology proceeds to step 1114, where one or more machine learning algorithms are applied to the closed work orders to identify work orders having features, or combinations of features, that are anomalous based on a holistic analysis of all closed work orders. Unlike the statistical analysis performed at step 1108, the holistic machine learning analysis performed at step 1114 is performed on all work orders as a collective whole, rather than being performed separately on pre-clustered sets of work orders. In this way, the machine learning analysis can identify work orders having features or feature combinations that are significant or notable outliers relative to other, more typical work orders. This approach can identify anomalous work orders that may not be detectable using the cluster-specific statistical analysis described above, particularly in the case of work orders for maintenance operations for which only a small number of work orders are available, resulting in small clusters that render detection of anomalies within those clusters difficult.

In some embodiments, multiple different machine learning algorithms can be applied at step 1114, where each machine learning algorithm is designed for a different analytic specialty or approach. This can diversify the approaches used to identify anomalous work orders, improving the chances that anomalous work orders will be detected.

At 1116, one or more anomaly detection scores are generated for each work order based on results of the holistic analysis performed at step 1114. In embodiments in which multiple machine learning algorithms are applied at step 1114, each work order can be assigned an anomaly detection score by each of the machine learning algorithms, resulting in a number of anomaly detection scores equal to the number of machine learning algorithms Similar to the z-scores described above, a machine learning algorithm can assign an anomaly detection score of 1 to a work order if that machine learning algorithm determines that the work order is anomalous, or can assign an anomaly detection score of 0 if the machine learning algorithm determines that the work order is not anomalous.

Figure 11B:
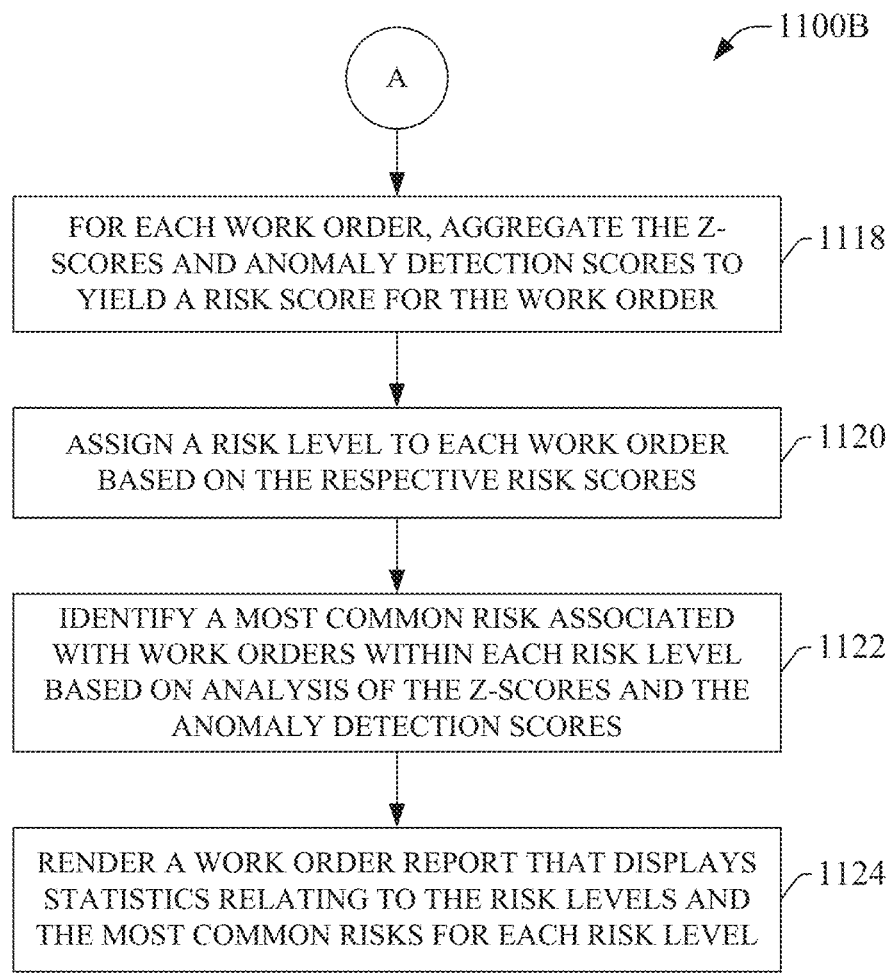
FIG. 11B is a flowchart of a second part of the example methodology for analyzing closed industrial work orders and generating risk reports based on the analysis.

The methodology then proceeds to the second part 1100B illustrated in FIG. 11B. At 1118, for each work order, the z-scores assigned to the work order's features at step 1110 and the anomaly detection scores assigned to the work order at step 1116 are aggregated to yield a composite risk score for the work order. In some embodiments, the risk score can be a value between 0 and 1, where the risk score increases as a function of the risk level of the work order. In general, the greater the number of z-scores and anomaly detection scores of 1 that have been assigned to a work order, the higher the composite risk score generated for the work order at step 1118.

At 1120, a risk level is assigned to each work order based on the respective risk scores assigned to the work orders at step 1118. In an example scenario, each work order can be categorized as being either high risk, medium risk, or low risk based on its risk score. At 1122, for each risk level assigned at step 1120, a most common risk associated with work orders within that risk level can be identified. The most common risk can be identified, for example, based on which work order features are most commonly flagged with z-scores of 1, and these features can be translated to a risk identification (e.g., abnormal delay, abnormal failure, abnormal configuration, etc.). At 1124, a work order report is rendered by the analysis system that displays statistics relating to the risk levels assigned at step 1120 and the most common risks identified at step 1122. These statistics can include, but are not limited to, an estimated excess duration of time spent on maintenance work orders within each risk level due to improperly performed maintenance (as represented by the anomalous work orders), an estimated excess number of asset failures resulting from improperly performed maintenance, a number of work orders within each risk level, site-specific breakdowns of the different risk levels, or other such information.

Figure 12:
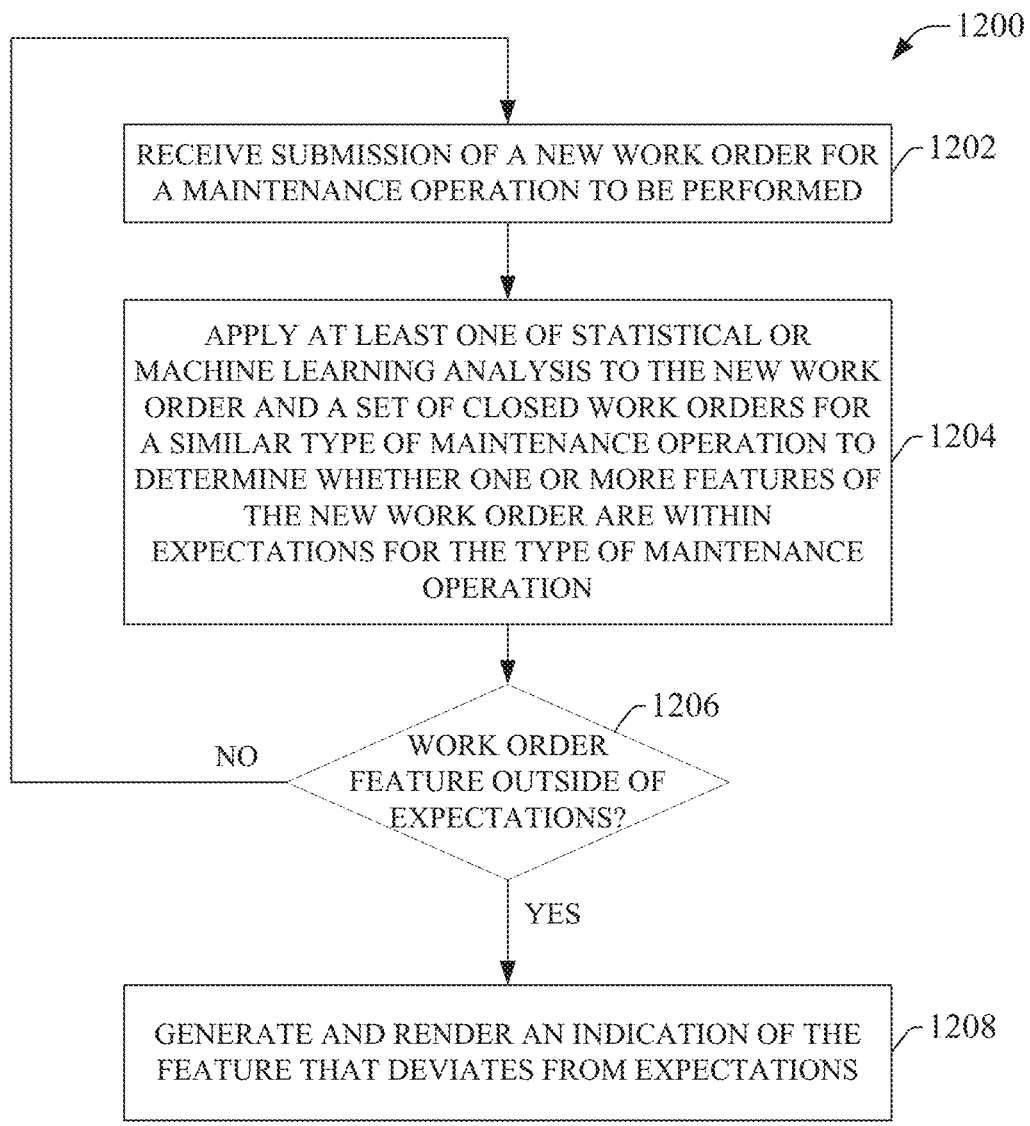
FIG. 12 is a flowchart of an example methodology for analyzing a newly submitted or open work order for a maintenance task to determine whether performance of the maintenance task is expected to deviate from expected performance.

FIG. 12 illustrates an example methodology 1200 for analyzing a newly submitted or open work order for a maintenance task to determine whether performance of the maintenance task is expected to deviate from the expected performance as recorded in the work order. Initially, at 1202, submission of a new work order for a maintenance operation to be performed is received by a work order management and analysis system. The submitted work order may comprise a number of data fields having values entered by the user submitting the work order. The values of the data fields represent features of the maintenance operation to be performed. These data fields can include, but are not limited to, a description of the maintenance task to be performed, an asset on which the maintenance is to be performed, an expected number of hours or days to complete the maintenance task, a number of maintenance personnel assigned to the maintenance task, or other such features.

At 1204, at least one of statistical or machine learning analysis is applied to the new work order and a set of closed work orders for similar types of maintenance operations. This analysis determines whether one or more features of the work order—as represented by the submitted values of the work order's data fields—are within expectations for the type of maintenance operation to be performed. In some embodiments, the analysis can include a statistical analysis similar to that of step 1106, whereby z-scores are assigned to the features of the new work order based on whether those features are anomalous relative to closed work orders for similar maintenance operations carried out in the past on the same or similar industrial assets. This can include, for example, determining whether the expected amount of time to complete the maintenance operation recorded in the new work order is greater or less than a range of expected time durations for completing the task, as determined based on statistical analysis of the closed work orders for similar tasks. Other features of the work order can also be assessed in this manner, including but not limited to the number of maintenance personnel required to complete the task, expected expenditures required for the task (e.g., for purchase of replacement parts or materials), or other such metrics.

At 1206, a determination is made as to whether one or more features of the new work order are outside of expectations based on the analysis performed at step 1204. If any of the features of the new work order deviate from a range of expected or typical values for those features (YES at step 1206), the methodology proceeds to step 1208, where an indication of the feature that deviates from expectations is generated and rendered. In an example scenario, if the expected number of hours required to complete the maintenance job entered on the new work order is less than a minimum expected time as determined based on analysis of closed work orders for a similar type of job, the system can indicate that the newly opened maintenance task is likely to experience a delay. Similarly, if the number of personnel assigned to perform the task is determined to be less than the number of personnel typically assigned to the task as determined based on analysis of closed work orders for similar maintenance tasks, the system can generate an indication that more maintenance personnel may be required to compete the task within the expected time. In some embodiments, the system may generate and display recommendations for bringing one or more metrics of the work order— e.g., expected time to complete—within expectations. For example, the system may determine, based on analysis performed at step 1204, that assigning additional maintenance personnel to the task will mitigate an expected delay in completing the maintenance task.

Figure 13:
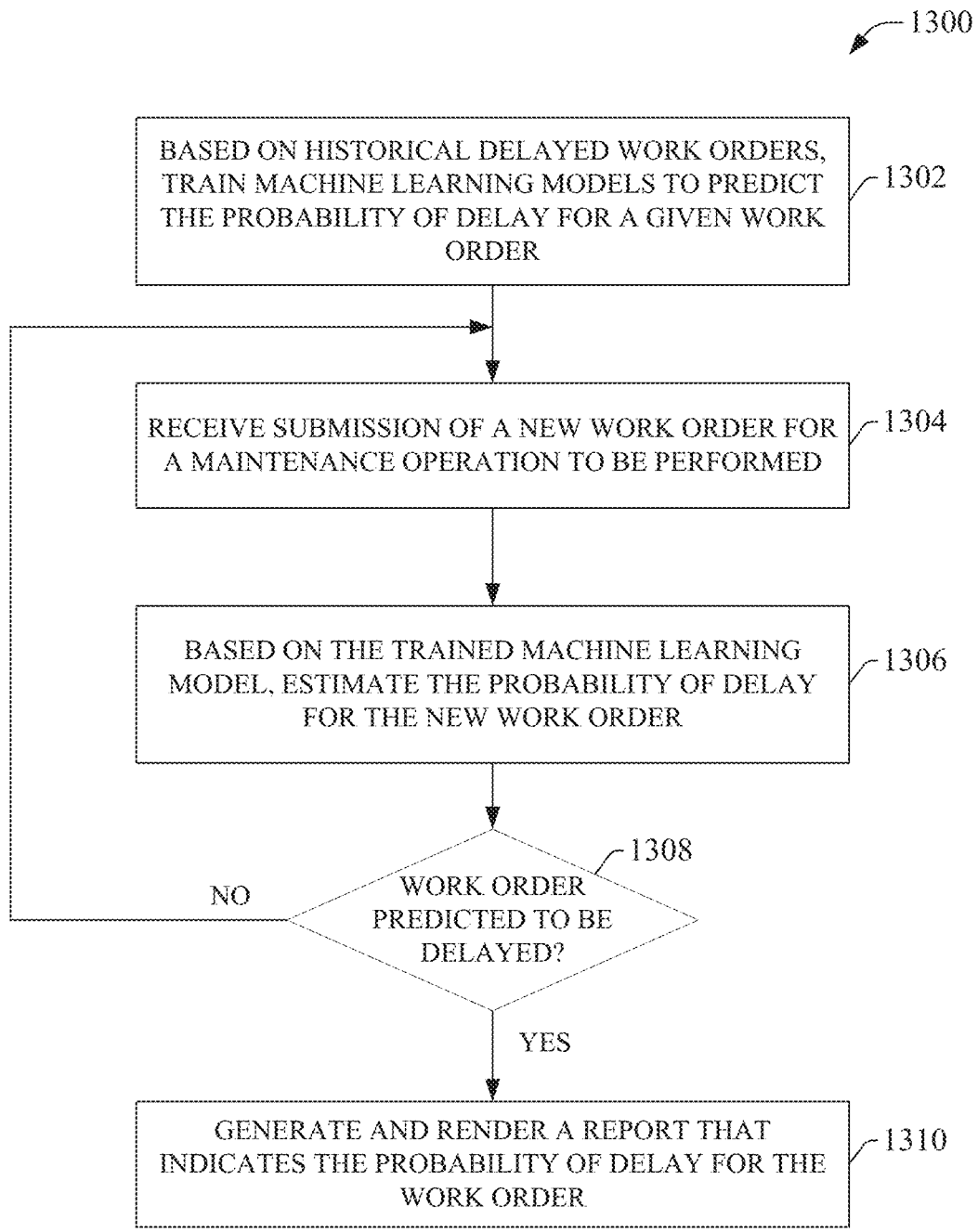
FIG. 13 is a flowchart an example methodology for detecting work order entry errors when a new work order is submitted to a work order management and analysis system.

FIG. 13 illustrates an example methodology 1300 for predicting work order delays when a new work order is submitted to a work order management and analysis system. Initially, at 1302, machine learning models are trained to predict the probability of delay for a given work order based on historical delayed work orders. At 1304, submission of a new work order for a maintenance operation to be performed is received by the system. At 1306, the probability that the new work order received at step 1304 is estimated based on the machine learning model that was trained at step 1302. At 1308, a determination is made as to whether the work order is predicted to be delayed in excess of an expected completion time based on the estimate obtained at step 1306. If the new work order is not predicted to be delayed (NO at step 1308), the methodology returns to step 1304. Alternatively, if the new work order is predicted to be delayed (YES at step 1308), the methodology proceeds to step 1310, where a report indicating the probability of delay for the new work order is generated and rendered.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 14:
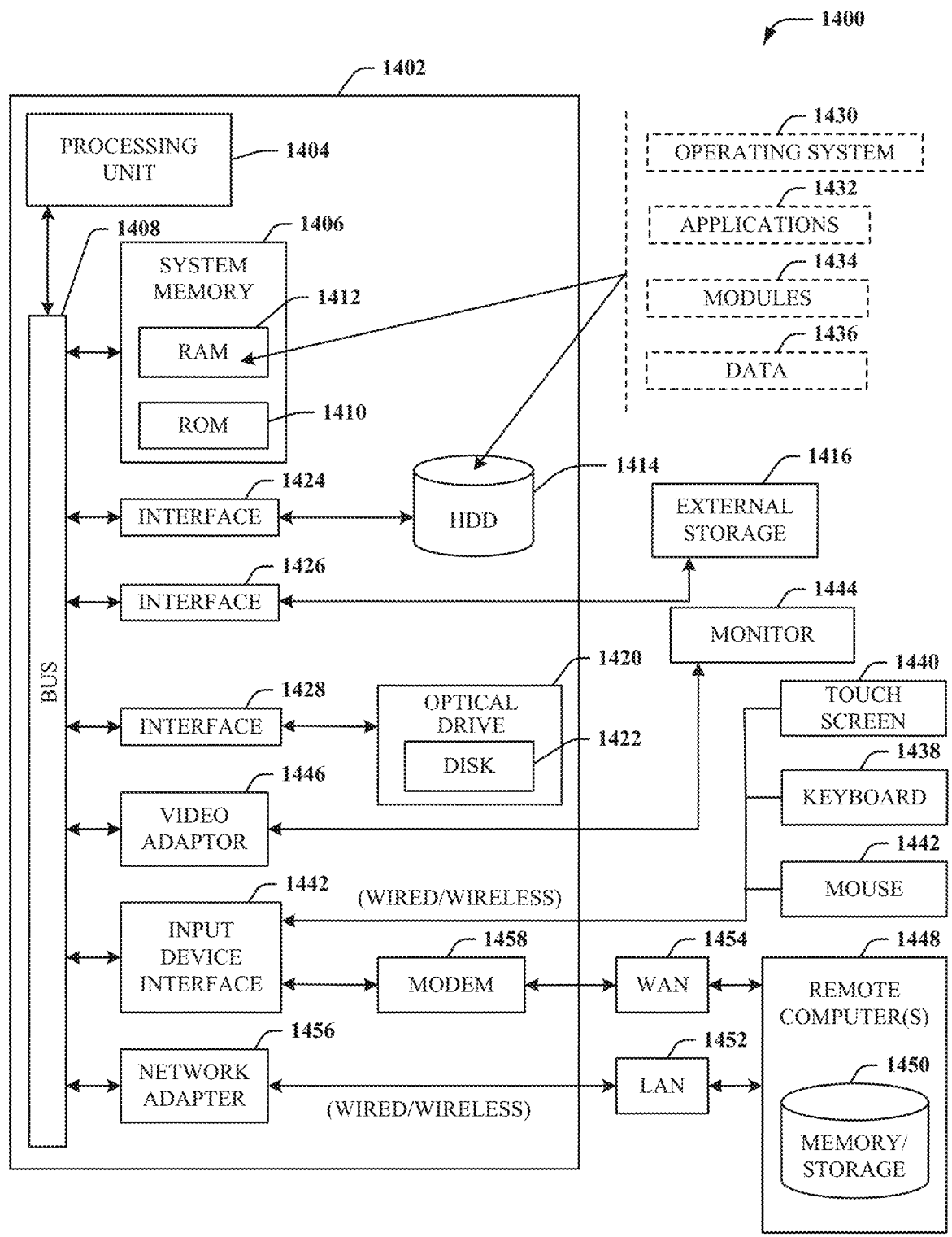
FIG. 14 is an example computing environment.
Figure 15:
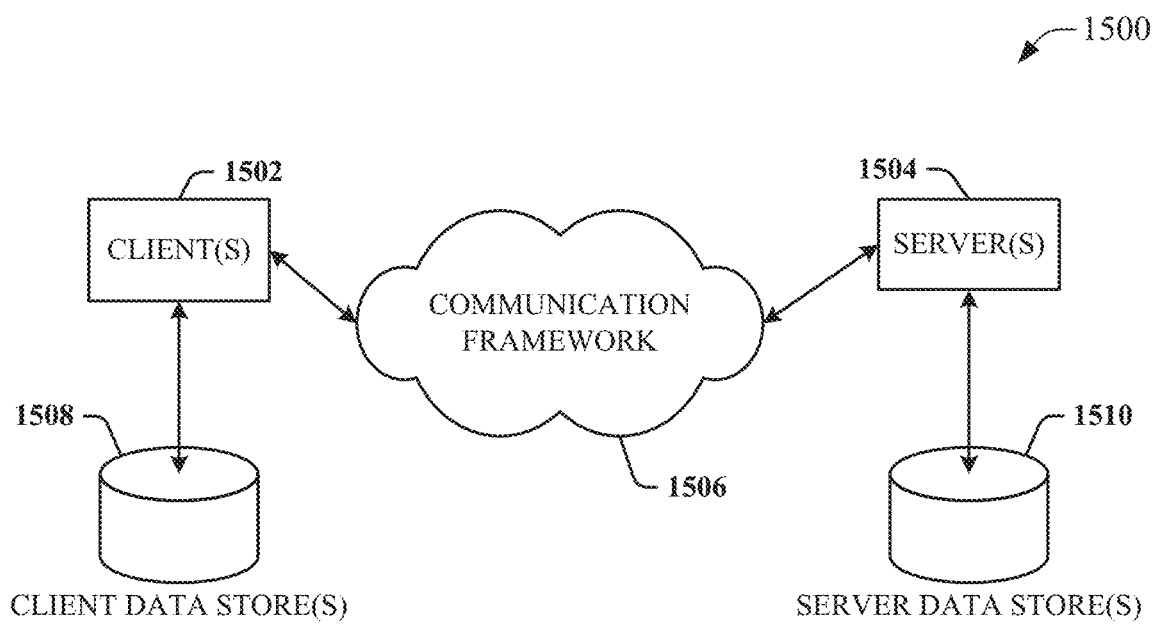
FIG. 15 is an example networking environment.

In order to provide a context for the various aspects of the disclosed subject matter, FIGS. 14 and 15 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14 the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for application programs 1432. Runtime environments are consistent execution environments that allow application programs 1432 to run on any operating system that includes the runtime environment. Similarly, operating system 1430 can support containers, and application programs 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1444 or other type of display device can be also connected to the system bus 1408 via an interface, such as a video adapter 1446. In addition to the monitor 1444, a computer typically includes other peripheral output devices (not shown), such as speakers, printers, etc.

The computer 1402 can operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1452 through a wired and/or wireless communication network interface or adapter 1456. The adapter 1456 can facilitate wired or wireless communication to the LAN 1452, which can also include a wireless access point (AP) disposed thereon for communicating with the adapter 1456 in a wireless mode.

When used in a WAN networking environment, the computer 1402 can include a modem 1458 or can be connected to a communications server on the WAN 1454 via other means for establishing communications over the WAN 1454, such as by way of the Internet. The modem 1458, which can be internal or external and a wired or wireless device, can be connected to the system bus 1408 via the input device interface 1442. In a networked environment, program modules depicted relative to the computer 1402 or portions thereof, can be stored in the remote memory/storage device 1450. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1452 or WAN 1454 e.g., by the adapter 1456 or modem 1458, respectively. Upon connecting the computer 1402 to an associated cloud storage system, the external storage interface 1426 can, with the aid of the adapter 1456 and/or modem 1458, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 15 is a schematic block diagram of a sample computing environment 1500 with which the disclosed subject matter can interact. The sample computing environment 1500 includes one or more client(s) 1502. The client(s) 1502 can be hardware and/or software (e.g., threads, processes, computing devices). The sample computing environment 1500 also includes one or more server(s) 1504. The server(s) 1504 can also be hardware and/or software (e.g., threads, processes, computing devices). The servers 1504 can house threads to perform transformations by employing one or more embodiments as described herein, for example. One possible communication between a client 1502 and servers 1504 can be in the form of a data packet adapted to be transmitted between two or more computer processes. The sample computing environment 1500 includes a communication framework 1506 that can be employed to facilitate communications between the client(s) 1502 and the server(s) 1504. The client(s) 1502 are operably connected to one or more client data store(s) 1508 that can be employed to store information local to the client(s) 1502. Similarly, the server(s) 1504 are operably connected to one or more server data store(s) 1510 that can be employed to store information local to the servers 1504.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
    a memory that stores executable components and work order data defining closed work orders for maintenance tasks that have been completed; and
    a processor, operatively coupled to the memory, that executes the executable components, the executable components comprising:
        a clustering component configured to cluster the work order data into groups of work orders corresponding to respective types of maintenance operations;
        a z-scoring component configured to apply, for a group of work orders of the groups of work orders, statistical analysis that identifies one or more features of a work order, included in the group of work orders, that are anomalous relative to corresponding one or more features of other work orders included in the group of work orders;
        a holistic anomaly detection component configured to determine, based on application of a machine learning algorithm to the closed work orders, boundaries of a multi-dimensional feature space within which values of a combination of more than two features of the closed work orders are typically located, and
        determine whether values of the combination of more than two features for the work order deviate from the multi-dimensional feature space;
        a risk score component configured to generate a risk score for the work order based on a number of the one or more features that are anomalous, identities of the one or more features, and a determination of whether the values of the combination of more than two features of the work order deviate from the multi-dimensional feature space, and to assign a risk level to the work order based on the risk score; and
        a user interface component configured to generate and render a work order report that displays the risk level for the work order.

2. The system of claim 1, wherein the one or more features are at least one of a description of a maintenance operation, an estimated number of hours to be spent on the maintenance operation, a number of maintenance personnel assigned to the maintenance operation, an identifier of an industrial asset on which the maintenance operation is to be performed, an identifier of an industrial site at which the maintenance operation is to be performed, an estimated cost of the maintenance operation, an identity of a material to be used for the maintenance operation, or a number of steps to be performed to complete the maintenance operation.

3. The system of claim 1, wherein
    the risk level is one of multiple risk levels, and
    the user interface component is configured to display, on the work order report, a summary of work orders assigned to each of the multiple risk levels by the risk score component.

4. The system of claim 3, wherein the summary comprises at least one of an estimated excess duration of time spent on maintenance operations due to anomalous work orders assigned to each of the multiple risk levels, an estimated number of excess machine failures due to the anomalous work orders assigned to each of the multiple risk levels, or an indication of a most common risk associated with the anomalous work orders assigned to each of the multiple risk levels.

5. The system of claim 3, wherein
    the summary comprises at least an indication of a most common risk associated with anomalous work orders assigned to each of the multiple risk levels, and
    the most common risk for a risk level, of the multiple risk levels, is determined based on an identity of a work order feature that is most frequently determined to be anomalous among work orders assigned to the risk level.

6. The system of claim 3, wherein the user interface component is further configured to display site-specific summaries of the work orders assigned to each of the multiple risk levels by the risk score component.

7. The system of claim 1, wherein
    the work order data further defines open work orders for pending maintenance operations,
    the executable components further comprise a validation component configured to determine whether a value of a feature defined for an open work order, of the open work orders, is anomalous relative to values of the feature for a subset of the closed work orders corresponding to a similar maintenance operation to that of the open work order, and
    the user interface component is further configured to render, in response to a determination by the validation component that the value of the feature is anomalous, an indication that the value of the feature requires review.

8. The system of claim 1, wherein
    the work order data further defines open work orders for pending maintenance operations,
    the clustering component is further configured to cluster the open work orders into groups of open work orders corresponding to respective types of maintenance operations, and
    the executable components further comprise an error detection component configured to perform at least one of statistical analysis or machine learning analysis to a group of open work orders, of the groups of open work orders, to identify one or more data entries of an open work order that are anomalous relative to other open work orders within the group of open work orders.

9. A method, comprising:
    clustering, by a system comprising a processor, work order data that defines closed work orders into groups of work orders corresponding to respective types of maintenance tasks;

identifying, by the system based on statistical analysis applied to a group of work orders of the group of work orders, one or more features of a work order, included in the group of work orders, that are anomalous relative to corresponding one or more features of other work orders included in the group of work orders;

determining, by the system based on application of a machine learning algorithm to the closed work orders, boundaries of a multi-dimensional feature space within which a combination of values of three or more features of the closed work orders are typically located;

determining, by the system, whether values of the combination of three or more features for the work order are outside the multi-dimensional feature space;

generating, by the system, a risk score for the work order based on a number of the one or more features that are anomalous, identities of the one or more features, and a result of the determining of whether the values of the combination of three or more features of the work order are outside the multi-dimensional feature space;

assigning, by the system, a risk level to the work order based on the risk score; and rendering, by the system, a work order report that displays the risk level for the work order.

10. The method of claim 9, wherein the one or more features are at least one of a description of a maintenance task, an estimated number of hours to be spent on the maintenance task, a number of maintenance personnel assigned to the maintenance task, an identifier of an industrial asset on which the maintenance task is to be performed, an identifier of an industrial facility at which the maintenance task is to be performed, an estimated cost of the maintenance task, an identity of a material to be used for the maintenance task, or a number of steps to be performed to complete the maintenance task.

11. The method of claim 9, wherein
the risk level is one of multiple risk levels, and
the method further comprises rendering, by the system as part of the work order report, a summary of work orders assigned to each of the multiple risk levels.

12. The method of claim 11, wherein the rendering of the summary comprises rendering at least one of an estimated excess duration of time spent on maintenance tasks due to anomalous work orders assigned to each of the multiple risk levels, an estimated number of excess machine failures due to the anomalous work orders assigned to each of the multiple risk levels, or an indication of a most common risk associated with the anomalous work orders assigned to each of the multiple risk levels.

13. The method of claim 11, wherein the rendering of the summary comprises:
determining a most common risk associated with anomalous work orders assigned to each of the multiple risk levels based on an identity of a work order feature that is most frequently determined to be anomalous among work orders assigned to each of the multiple risk levels, and
rendering an indication of the most common risk associated with anomalous work orders assigned to each of the multiple risk levels.

14. The method of claim 9, wherein
the work order data further defines open work orders for pending maintenance tasks, and
the method further comprises:
determining, by the system, whether a value of a feature defined for an open work order, of the open work orders, is anomalous relative to values of the feature for a subset of the closed work orders corresponding to a similar maintenance task to that of the open work order; and
rendering, by the system, an indication that the feature defined for the open work order is anomalous.

15. A non-transitory computer-readable medium having stored thereon instructions that, in response to execution, cause a system comprising a processor to perform operations, the operations comprising:
clustering work order data that defines closed work orders into groups of work orders corresponding to respective types of maintenance operations;

identifying, based on statistical analysis applied to a group of work orders of the group of work orders, one or more features of a work order, included in the group of work orders, that deviate from corresponding one or more features of other work orders included in the group of work orders;

determining, based on application of a machine learning algorithm to the closed work orders, boundaries of a multi-dimensional feature space within which a combination of values of more than two features of the closed work orders are typically located;

determining whether values of the combination of more than two features for the work order deviate from the multi-dimensional feature space;

generating a risk score for the work order based on a number of the one or more features that deviate, identities of the one or more features, and a result of the determining of whether the values of the combination of more than two features of the work order deviate from the multi-dimensional feature space;

assigning the work order to a risk level, of multiple defined risk levels, based on the risk score; and displaying, on a client device, a work order report that displays the risk level to which the work order is assigned.

16. The non-transitory computer-readable medium of claim 15, wherein the one or more features are at least one of a description of a maintenance task, an estimated number of hours to be spent on the maintenance task, a number of maintenance personnel assigned to the maintenance task, an identifier of an industrial asset on which the maintenance task is to be performed, an identifier of an industrial site at which the maintenance task is to be performed, an estimated cost of the maintenance task, an identity of a material to be used for the maintenance task, or a number of steps to be performed to complete the maintenance task.

17. The non-transitory computer-readable medium of claim 15, wherein
the risk level is one of multiple risk levels, and
the operations further comprise rendering, as part of the work order report, a summary of work orders assigned to each of the multiple risk levels.

18. The non-transitory computer-readable medium of claim 17, wherein the rendering of the summary comprises rendering at least one of an estimated excess duration of time spent on maintenance tasks due to anomalous work orders assigned to each of the multiple risk levels, an estimated number of excess machine failures due to the anomalous work orders assigned to each of the multiple risk levels, or an indication of a most common risk associated with the anomalous work orders assigned to each of the multiple risk levels.

19. The non-transitory computer-readable medium of claim 17, wherein the rendering of the summary comprises:

determining a most common risk associated with anomalous work orders assigned to each of the multiple risk levels based on an identity of a work order feature that is most frequently determined to be anomalous among work orders assigned to each of the multiple risk levels, and rendering an indication of the most common risk associated with anomalous work orders assigned to each of the multiple risk levels.

20. The non-transitory computer-readable medium of claim 15, wherein the work order data further defines open work orders for pending maintenance tasks, and the operations further comprise:

determining whether a value of a feature defined for an open work order, of the open work orders, is anomalous relative to values of the feature for a subset of the closed work orders corresponding to a similar maintenance task to that of the open work order; and rendering an indication that the feature defined for the open work order is anomalous.

\* \* \* \* \*